US011505474B2

(12) United States Patent
Trujillo

(10) Patent No.: US 11,505,474 B2
(45) Date of Patent: Nov. 22, 2022

(54) SYSTEM AND METHOD TO IMPROVE CONTROL OF CONDUCTIVITY, FREE RESIDUAL CHLORINE, LEVEL, AND PH IN LARGE COOLING TOWERS

(71) Applicant: Ely Bencomo Trujillo, League City, TX (US)

(72) Inventor: Ely Bencomo Trujillo, League City, TX (US)

(73) Assignee: Calpine Corporation, Houston, TX (US)

( * ) Notice: Subject to any disclaimer, the term of this patent is extended or adjusted under 35 U.S.C. 154(b) by 162 days.

(21) Appl. No.: 16/873,046

(22) Filed: Jan. 21, 2020

(65) Prior Publication Data
US 2020/0172409 A1 Jun. 4, 2020

(51) Int. Cl.
C02F 1/00 (2006.01)
C02F 103/02 (2006.01)

(52) U.S. Cl.
CPC ........ *C02F 1/008* (2013.01); *C02F 2103/023* (2013.01); *C02F 2209/006* (2013.01); *C02F 2209/05* (2013.01); *C02F 2209/06* (2013.01); *C02F 2209/29* (2013.01); *C02F 2209/42* (2013.01)

(58) Field of Classification Search
None
See application file for complete search history.

(56) References Cited

U.S. PATENT DOCUMENTS

| 4,227,245 A * | 10/1980 | Edblad | B21B 37/16 700/95 |
|---|---|---|---|
| 2005/0139530 A1 * | 6/2005 | Heiss | C02F 9/00 210/85 |
| 2016/0203036 A1 * | 7/2016 | Mezic | G06F 11/079 714/819 |
| 2018/0284735 A1 * | 10/2018 | Celia | G01M 13/045 |

* cited by examiner

*Primary Examiner* — Richard C Gurtowski
(74) *Attorney, Agent, or Firm* — The Law Office of David W. Alexander, PLLC; David W. Alexander

(57) ABSTRACT

A system and method are disclosed which significantly improves the control of conductivity, concentration of free residual chlorine, basin level, and pH in forced-draft open recirculating cooling towers, with a basin capacity of 750,000 gallons of water or more. Conductivity, free residual chlorine, basin level, and pH are each controlled by a programmable PID controller operating in a sampled-data environment where the set point is a continuously updated rate-of-change set value for conductivity, free residual chlorine, basin level, and pH based on a near-time prior manipulated value. Programmable PID controller outputs to each control element a manipulated value to bring the rate-of-change of the process value equal to the rate-of-change of the set value.

24 Claims, 31 Drawing Sheets

SYSTEM AND METHOD TO IMPROVE CONTROL OF CONDUCTIVITY, FREE RESIDUAL CHLORINE, LEVEL, AND PH IN LARGE COOLING TOWERS

CROSS-REFERENCES RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A "SEQUENCE LISTING."

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

This disclosure relates to improving the control of operational parameters, including, but not limited to, conductivity, concentration of free residual chlorine, basin level, and pH, in large forced-draft open recirculating cooling towers; where large refers to a cooling tower with a basin capacity of 750,000 gallons of water or more.

This invention further relates to improving the control in a sampled-data control environment of operational parameters, including, but not limited to, conductivity, concentration of free residual chlorine, basin level, and pH, in cooling towers by using the set value and manipulated value to determine a continually updated rate-of-change set value and by using the process value to calculate a corresponding rate-of-change process value. The rate-of-change set value and rate-of-change process value are then used as inputs to a programmable proportional, integral, and derivative controller.

2. The Current State of the Art

Open recirculating forced-draft or induced-draft cooling water systems are open to the atmosphere and continuously recirculate the cooling water. Cooling towers transfer thermal energy via conduction to cooler ambient air and by evaporation of water. Makeup water is added to replace the water lost by evaporation, blowdown, and other water losses.

An open recirculating cooling tower acts as an ambient air scrubber. The ambient air introduces microorganisms, gases such as carbon dioxide, sulfur oxides, and nitrogen oxides, dust, and dirt into the circulating water. These contribute to the formation of deposits, corrosion, growth of pathogenic microorganisms, and algae. The evaporating water concentrates minerals in the cooling water which can also lead to mineral deposits throughout the cooling water system.

Among the numerous operational parameters that affect the operation of cooling towers, the more critical are conductivity, free residual chlorine, level, and pH. Controlling these parameters prevents or minimizes corrosion by activating other water treatment chemicals, limits biological growth, allows water to be recycled through the system longer, and prevents undesirable swings in chemical concentrations.

Efficiency in the use of cooling tower water is measured by cycles of concentration (COC). COC refers to the ratio of the concentration of a target chemical specie, or other water quality parameter, between the blowdown water in the numerator and makeup water as denominator. The most common method for determining COC uses conductivity of the makeup and blowdown, measured as microsiemens per centimeter ($\mu S/cm$). With this measure, most cooling towers operate within a COC range of 3 to 10; i.e., the conductivity of the water in the blowdown is 3 to 10 times that in the makeup water.

The state of the art for controlling conductivity, free residual chlorine, level, and pH, requires instrumentation to monitor these operational parameters, and controlled to desired conditions by inputting set points and process values to proportional, integral, and derivative (PID) controllers. A typical cooling tower showing these four measurements and their control points is shown in FIG. 1. Typical measurement methods are: conductivity by contacting probes, with an accuracy of +/−0.5% of actual, an operating temperature range consistent with expected tower extremes, and measurement compensated for temperature; free residual chlorine by amperometric on-line chlorine analyzers with the probe mounted some distance from the chlorine-containing chemical dosing point for mixing; level is monitored continuously by any one of capacitance, ultrasonic, radar, or other level-detection probes, preferably mounted in a stilling well and compensated for false readings from foam; and pH by a pH probe with range from 0 to 14, resolution of 0.01 pH units, and an accuracy of +/−0.02 pH units, with the probe mounted in the basin as far as possible from the acid dosing point to allow for mixing. The common methods of control are: conductivity by controlling a blowdown control valve to release water from the cooling tower basin; free residual chlorine by the addition of aqueous hypochlorite solution through a variable stroke pump; level by admitting makeup water to the basin through a makeup water control valve; and pH by the addition of an acid through a variable stroke pump.

State-of-the-art PID control suffers from dead time and/or lag time due to incomplete mixing of the cooling water. Dead time affects the controllability of free residual chlorine and pH because of the time to bring the chemically reactive species into contact; i.e., the chlorine-containing chemical in contact with the biologically active specie and the acid with the inorganic or organic base. All four parameters are affected by lag time. Dead time and lag time occur consecutively and contribute to undesirable control of conductivity, free residual chlorine, level, and pH.

3. Description of the Related Art Including Information Disclosed Under 37 C.F.R. 1.97 and 1.98

Although U.S. patents and published patent applications are known which disclose various devices and methods of controlling the conductivity, free residual chlorine, level, and pH in cooling towers, no prior art anticipates, nor in combination renders obvious, controlling these four parameters to achieve a set point that is a desired rate-of-change for each of them.

U.S. patents relevant here as prior art in the field of controlling one or more of conductivity, free residual chlorine, level, and pH, in cooling towers by other methods include: U.S. Pat. No. 4,273,146, Johnson, N. W., Cooling Tower Operation with Automated pH Control and Blowdown; U.S. Pat. No. 4,460,008, O'Leary, R. P., et al., Indexing controller apparatus for cooling water tower systems; U.S. Pat. No. 4,464,315, O'Leary, R. P., Indexing controller system and method of automatic control of cooling water tower systems; U.S. Pat. No. 5,057,229, Schulenburg, M., Apparatus and Process for the Treatment of Cooling Circuit Water; U.S. Pat. No. 5,403,521, Takahashi, K., Blow system and a method of use therefor in controlling the quality of recycle cooling water in a cooling tower; U.S. Pat. No. 7,632,412, Johnson, D. A., et al., Method for Chemistry Control in Cooling Systems.

No U.S. patent applications, not otherwise issuing as a patent, are relevant here as prior art in the field of controlling one or more of conductivity, free residual chlorine, level, and pH, in cooling towers, even by other methods.

BRIEF SUMMARY OF THE INVENTION

The present disclosure is directed towards a system and method for controlling operational parameters, including, but not limited to, conductivity, concentration of free residual chlorine, level, and pH, in large cooling towers by a pre-programmed electronic PID controller controlling the rate of change of the operational parameter to achieve a pre-selected rate-of-change set value. Conductivity is controlled by monitoring the rate-of-change of conductivity and adjusting the blowdown rate to achieve a rate-of-change conductivity set value; free residual chlorine is controlled by monitoring the rate of change of its concentration and adjusting the addition of chlorine or chlorine-containing chemical to achieve a rate-of-change chlorine set value; water level in the basin is controlled by monitoring the rate of change of level and adjusting the amount of makeup water to achieve a rate-of-change level set value; and pH is controlled by monitoring the rate of change of the pH and adjusting the addition of the appropriate pH-adjusting chemical to achieve a rate-of-change pH set value.

The controllability of conductivity, free residual chlorine, level, and pH at current states of the art and according to this disclosure is shown in Table 1.

TABLE 1

| Operational Parameter | State of the Art Control | Control Achieved by this Disclosure |
|---|---|---|
| Conductivity | Target +/− 500 µS/cm | Target +/− 30 µS/cm |
| Free Residual Chlorine | Target +/− 1.0 mg/l | Target +/− 0.1 mg/l |
| Level | Target +/− 5.0 inches | Target +/− 0.5 inches |
| pH | Target +/− 0.5 pH units | Target +/− 0.05 pH units |

Persons with ordinary skill in the art of operation of large open recirculating cooling towers would recognize that the improved controllability of conductivity, free residual chlorine, level, and pH disclosed in Table 1 will increase the COC by at least 1 across the heretofore COC operating range of 3 to 5. The increased COC reduces makeup water and treatment chemical requirements resulting in less corrosion, biological growth, and undesirable swings in chemical concentrations.

These features with other technological improvements, which will become subsequently apparent, reside in the details of programming and operation as more fully described hereafter and claimed, reference being had to the accompanying drawings forming a part hereof.

BRIEF DESCRIPTION OF THE SEVERAL VIEWS OF THE DRAWINGS

1. Brief Description of the Several Views of the Drawings

The present application will be more fully understood by reference to the following figures, which are for illustrative purposes only. The figures are not necessarily drawn to scale and elements of similar structures or functions are represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION OF THE INVENTION

Figure 1:
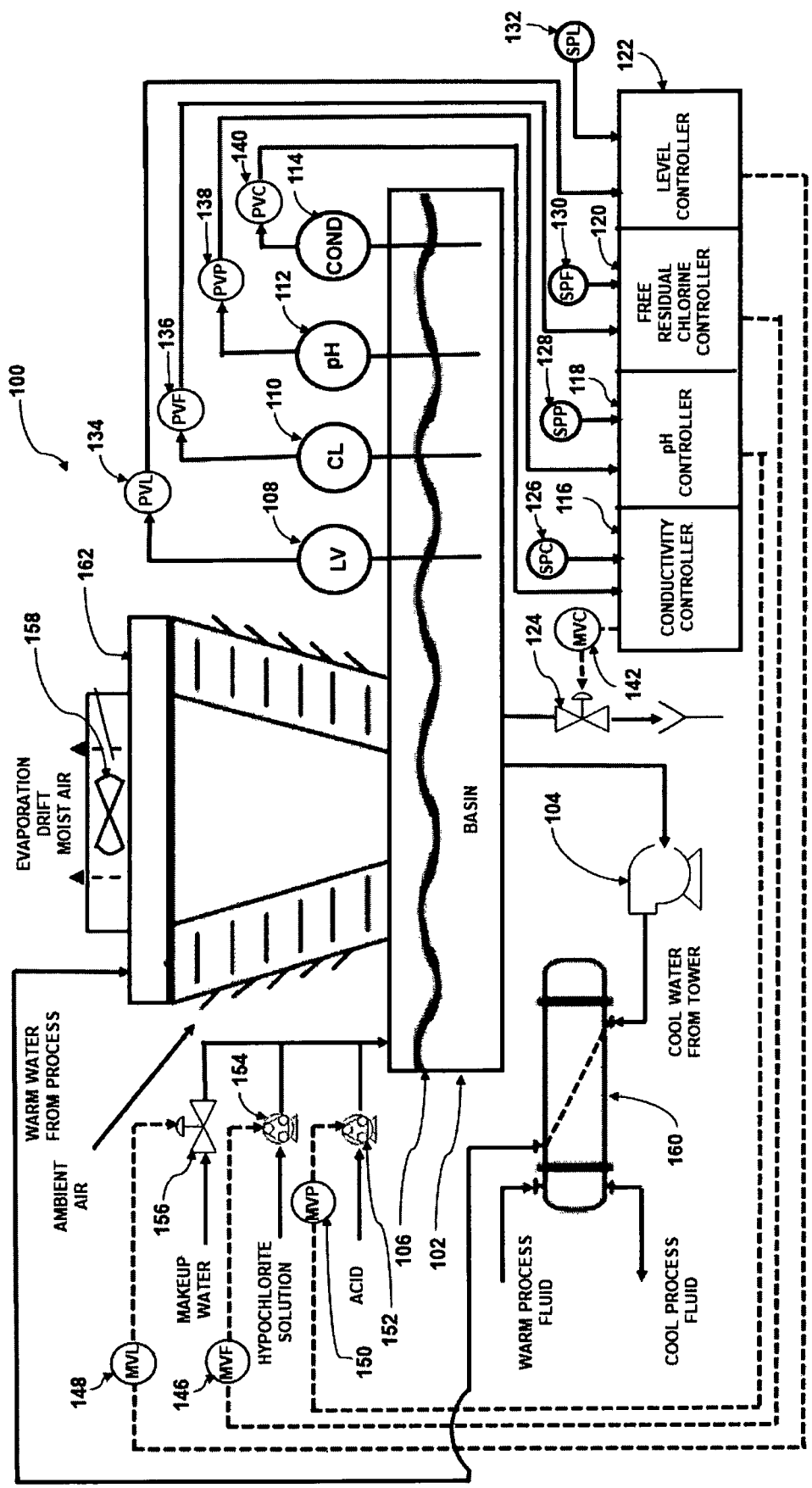
FIG. 1 illustrates a cooling tower with the probes, controllers, control valves, and variable stroke pumps for controlling conductivity, free residual chlorine, level, and pH.

1. Glossary of Terms Used in the Disclosure

"Algorithm" means a finite sequence of well-defined, computer-implementable instructions to solve a problem or to perform a computation. It is an unambiguous specification for programming a programmable device for data to input, perform calculations on that data, and to output data to other algorithms or to external devices, such as a control valve or variable stroke pump. More than one algorithm may be required to solve a problem or to perform a computation.

"Control element" means any one or more of devices that respond to a manipulated variable whose action causes the process value to move towards the set value. It is the last element that responds quantitatively to a control signal and performs the actual control action. Examples include control valves, positionable ball values, variable speed pumps, variable stroke pumps, solenoid operated valves, or servomotors.

"Electronic data storage" or "memory" mean computer memory comprised of any type of integrated circuit or other storage device adapted for storing digital data connected to the programmable controller, including, without limitation, any kind of hard drive or hard disk drive, solid state drive, read only memory, programmable read-only memory, electrically erasable programmable read-only memory, or random-access memory. In this disclosure, "conductivity data storage" means data storage dedicated to controlling conductivity, "chlorine data storage" means data storage dedicated to controlling the concentration of free residual chlorine, "level data storage" means data storage dedicated to controlling water level, and "pH data storage" means data storage dedicated to controlling pH.

"Manipulated value" or "manipulated variable" mean the output from a programmable controller communicated to a control element with the objective to reduce the difference between the set value and the corresponding process value. In this disclosure, "conductivity manipulated value," "chlorine manipulated value," "level manipulated value" and "pH manipulated value" mean the manipulated value as defined in the preceding sentence for that operational parameter.

"Operational parameter" or "operational parameters" mean one or more of the numerous water quality and other parameters that impact the operation of cooling towers, including, but without limitation: (1) conductivity; (2) free residual chlorine; (3) level; (4) pH; (5) hardness; (6) alkalinity; (7) concentration of silica; (8) total dissolved solids; (9) total suspended solids; (10) ammonium ion concentration; (11) phosphate ion concentration; (12) chloride ion concentration; (13) iron concentration; (14) biological oxygen demand; (15) chemical oxygen demand; (16) nitrate concentration; (17) nitrite concentration; (18) zinc ion concentration; (19) organics; and (20) fluoride ion concentration.

"PID controller" or "controller" means the digital computing device embedded within a programmable controller or programmable PID controller that calculates an error value as the difference between an inputted set value and a corresponding process variable or a rate-of-change set value and a corresponding rate-of-change process value and applies a corrective output based on proportional, integral, and derivative control technology.

"Process value" means the actual measurable value for each operational parameter; for example, conductivity, free residual chlorine, level, or pH. In this disclosure, "conductivity process value" means the actual measured conductivity of the cooling water, "chlorine process value" means the actual concentration of free residual chlorine, "level process value" means the actual level of water in the cooling tower basin, and "pH process value" means the actual pH of the cooling water.

"Programmable controller" or "programmable PID controller" mean a digital computer, programmable logic computer, or programmable logic controller, which has been adapted for the control of processes or operational parameters, including one or more of the operational parameters of a cooling tower, that is reliable, programmable via a man-machine interface, and with an embedded PID controller. In this disclosure, "conductivity controller" means a programmable controller dedicated to controlling conductivity, "chlorine controller" means a programmable controller dedicated to controlling the concentration of free residual chlorine, "level controller" means a programmable controller dedicated to controlling water level in the cooling tower basin, and "pH controller" means a programmable controller dedicated to controlling pH.

"Provisioning" or "provisioned" means preparing, or having already prepared, an electronic device, such as a programmable controller, to function as intended.

"Rate-of-change operational parameter" is the difference between an operational parameter sampled at any time and the same operational parameter sampled at any preceding time divided by the elapsed time between the samples. The operational parameters may or may not have been smoothed and the time between samples for determining the rate-of-change may be a function of the actual elapsed time between the samples.

"Rate-of-change process value" is the difference between a process value, that may or may not be smoothed, sampled at any time and the same process value, that may or may not have been smoothed, sampled at any preceding time divided by a time that is a function of the elapsed time between the samples. In this disclosure, "rate-of-change conductivity process value," "rate-of-change chlorine process value, "rate-of-change level process value" and "rate-of-change pH process value" means the rate-of-change as defined in the preceding sentence for that process value.

"Rate-of-change set value" for an operational parameter is that set value determined from the manipulated value sampled at a preceding time when communicated to the control element for that same operational parameter. In this disclosure, "rate-of-change conductivity set value," "rate-of-change chlorine set value, "rate-of-change level set value" and "rate-of-change pH set value" means the rate-of-change as defined in the preceding sentence for that set value.

"Set point" or "set value" mean the desired or target value of any one or more of the corresponding process values. For a cooling tower, the conductivity set value may be 4,000 µS/cm, the free residual chlorine set value may be 3 ppm, the level set value may be 36 inches, and pH set value may be 7.5 pH units. In this disclosure, "conductivity set value" means the target conductivity of the cooling water, "chlorine set value" means the target concentration of free residual chlorine, "level set value" means the target water level in the cooling tower basin, and "pH set value" means the target pH of the cooling water.

"Software" means a collection of data or computer instructions and computer programs that provides instructions to the programmable controller and executes algorithms. In this disclosure, "conductivity software" means software for controlling conductivity, "chlorine software" means software for controlling the concentration of free residual chlorine, "level software" means software for controlling water level in the cooling tower basin, and "pH software" means software for controlling pH.

"Smooth," "smoothing," or "smoothed" means mathematically giving weight to the most recent sample of a variable and diminishing weight to the preceding sample of the same variable; thereby reducing the variation between variables sampled at intervals. The relative weight given to the most recent value is determined by the "Smoothing Constant." The smoothed variable is calculated from the expression;

Smoothed Variable at a Time=Sampled Variable at a Time−(Sampled Variable at a Time÷Smoothing Constant)+(Sampled Variable at a Preceding Time÷Smoothing Constant), where the Smoothing Constant= $e^{(Time\ Between\ Samples/(Smoothing\ Time-1))}$, for all Smoothing Time greater than 1.

2. Detailed Description of the Preferred Embodiment of the System

In FIG. 1, given is a forced- or induced-draft cooling tower assembly 100, comprising louvered casing 162, fan 158, basin 102 having a volumetric capacity of 750,000 gallons or more, basin design depth nominally 24 inches to 60 inches, at least one (1) circulation pump 104, at least one (1) heat transfer device 160, and basin containing water of level 106, nominally one-half (½) to two-thirds (⅔) of design depth.

With the given cooling tower, the control system disclosed here comprises a level probe 108, chlorine probe 110, pH probe 112, and conductivity probe 114. The system still further comprises programmable controllers, 116, 118, 120, and 122, provisioned for proportional, integral, and derivative (PID) control, and with sufficient memory to store user-entered data, software programs and monitored data history for a pre-selected time, at least one (1) input and one (1) output, user interface for programming, digital display of set value, process value, and manipulated value. The system still further comprises item 108 electronically connected to level controller 122, 110 electronically connected to chlorine controller 120, 112 electronically connected to pH controller 118, and 114 electronically connected to conductivity controller 116. The phrase electronically connected means a connection that may be by hard wire or wireless technology. The four (4) programmable controllers may be housed in one enclosure, or each in their own enclosure.

Referring to FIG. 1, the four (4) inputs comprise: 108 communicating measured level process value PVL, item 134, to 122; 110 communicating measured chlorine process value PVF, item 136, to 120; 112 communicating measured pH process value PVP, item 138, to 118; and 114 communicating measured conductivity process value PVC, item 140 to 116. The four (4) outputs comprise: 122 communicating manipulated value MVL, item 148, to level control valve 156; 120 communicating manipulated value MVF, item 146, to hypochlorite dosing pump 154; 118 communicating manipulated value MVP, item 150, to acid dosing pump 152; and 116 communicating manipulated value MVC, item 142, to conductivity control valve 124.

For conductivity measurement, the preferred embodiment comprises a probe capable of detecting the conductivity of cooling water ranging from 0 to 10,000 µS/cm with Pt100RTD integrated temperature sensor, connected to a conductivity transmitter with resolution of 10 µS/cm, accuracy no less than 1% of full scale, operating temperature of 32° F. to 212° F., and 4 to 20 mA output. For free residual chlorine measurement, the preferred embodiment comprises a probe with measuring range of 0 to 5 ppm free chlorine at pH of 5.5 to 8.5, operating temperature of 32° F. to 120° F., and 4 to 20 mA output. For level measurement, the preferred embodiment comprises a reflective ultrasonic liquid level transmitter, nominal 60-inch measurement range, accuracy of +/−0.2% of full range, operating temperature of 32° F. to 176° F., and 4 to 20 mA output. For pH measurement, the preferred embodiment comprises a differential pH probe with measurement range of 0 to 14, stability of 0.03 pH units per 24 hours, non-cumulative, temperature measured by internal 10K NTC thermistor with compensation, operating temperature of 32° F. to 185° F., and direct 4 to 20 mA output.

Set values for controllers, 116, 118, 120, and 122 are entered by a user. Depending on makeup conductivity and COC, conductivity set point SPC, 126, nominally ranges from 2,000 to 5,000 µS/cm. pH set point SPP, 128, nominally ranges from 6 to 9 pH units. Free residual chlorine set point SPF, 130, nominally ranges from 0.3 to 0.5 mg/l. Level set point SPL, 132, nominally ranges from 12 to 48 inches depending on the working depth of basin 102.

The conductivity, chlorine, level, and pH controllers operate on sampled-data; i.e., the process values and set values are sampled at consecutive discrete intervals. The discrete interval is set by the user as a scan time (ST); nominally 200 milliseconds to 1,000 milliseconds. Specifically, the process value and set value are sampled at the discrete times, t=T+(n−1)*ST, where T is an arbitrary start time and n is a sequential positive integer 1, 2, 3, . . . N. The first samples occur at time t=T; i.e., n=1.

PID controllers currently act on the difference between the process value and set value to determine the manipulated value; which is communicated to the appropriate control element. The PID controller outputs a manipulated value with the objective of reducing the difference between the process value and set value as quickly as possible and maintaining that difference as near to zero as possible. Traditionally, once set, the set value does not frequently change.

In this invention, the programmable PID controller is provisioned through algorithms to calculate a continuously updated rate-of-change set value and a rate-of-change process value from the set value and process value; all at time t=T+(n−1)*ST, where n>1. The continuously updated rate-of-change set value and rate-of-change process value are inputted to an embedded PID controller with the objective of more quickly reducing the difference between the process value and set value and more effectively maintaining the difference between them to as near to zero as possible. The rate-of-change of the process value requires a sample at t=T+(n−1)*ST and a saved-to-memory prior sample at t=T+(n−2)*ST, at equal n>1, to calculate the rate-of-change of that process value. The continuously updated rate-of-change set value at t=T+(n−1)*ST is determined from the PID controller's output, the manipulated value, at t=T+(n−2)*ST for n>1.

Figure 3:
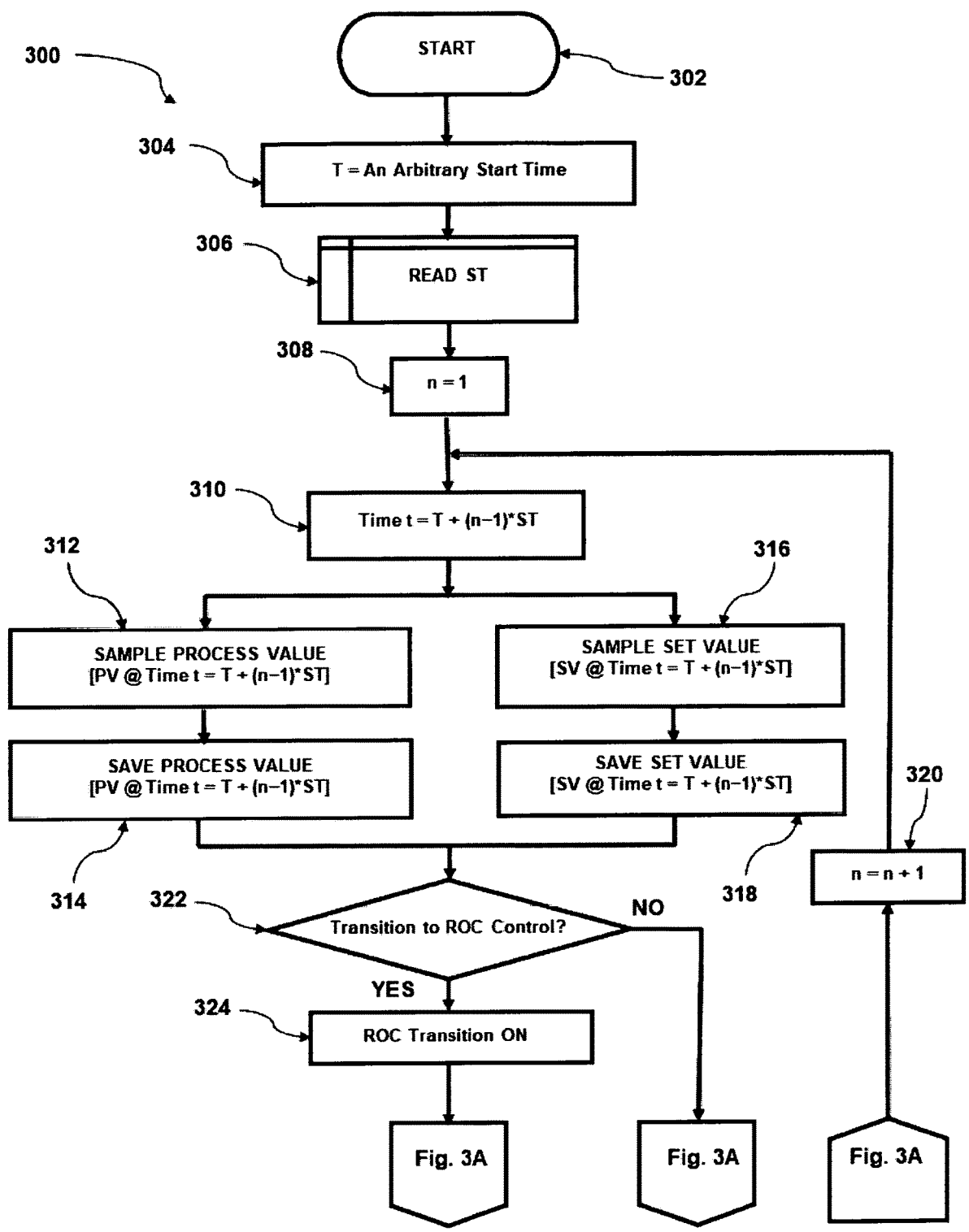
FIGS. 3, 3A, 3B, 3C, 3D, 3E, and 3F are flow charts showing the main program (MN Program) common to all controllers.
Figure 3F:
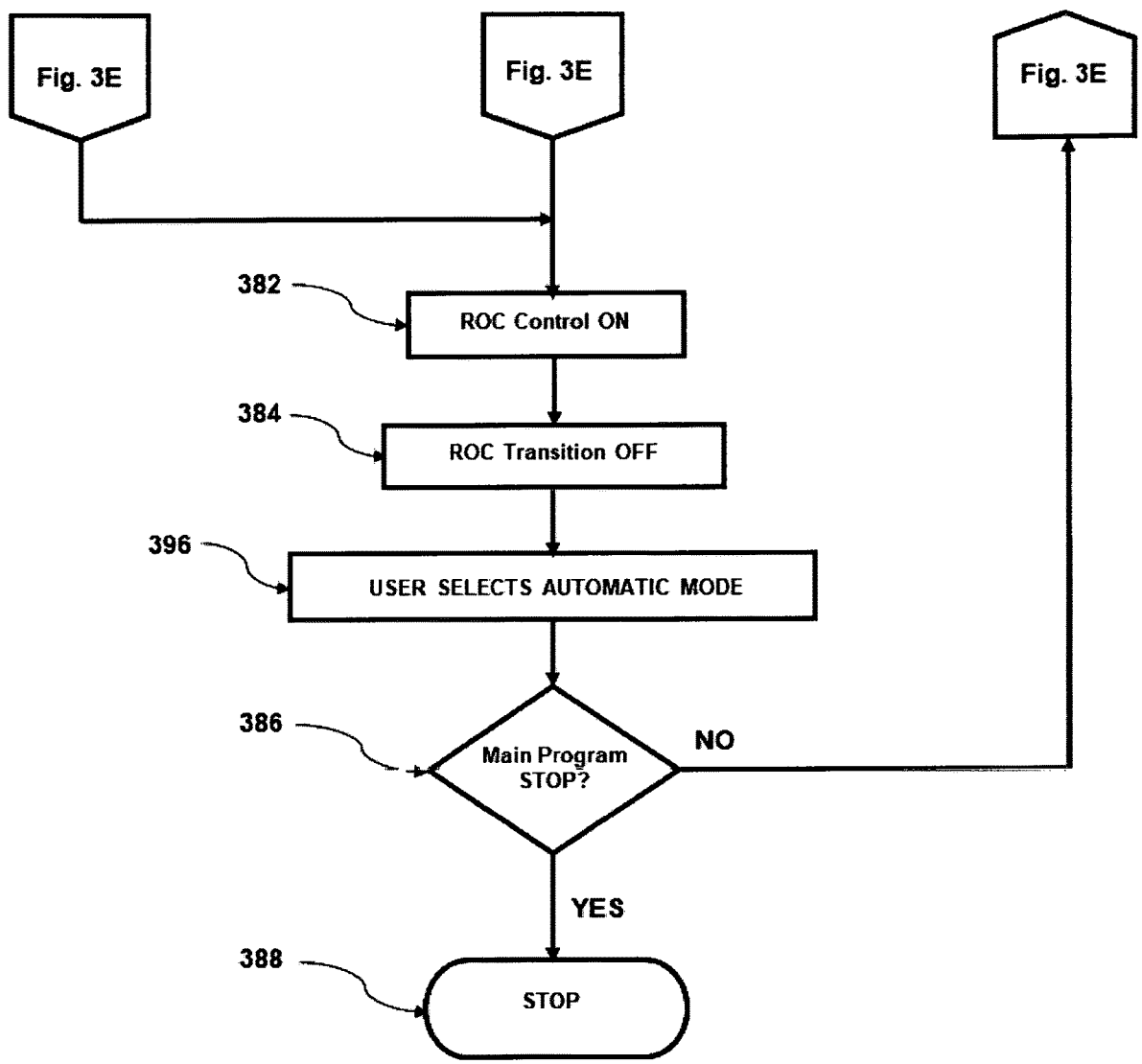
Figure 4:
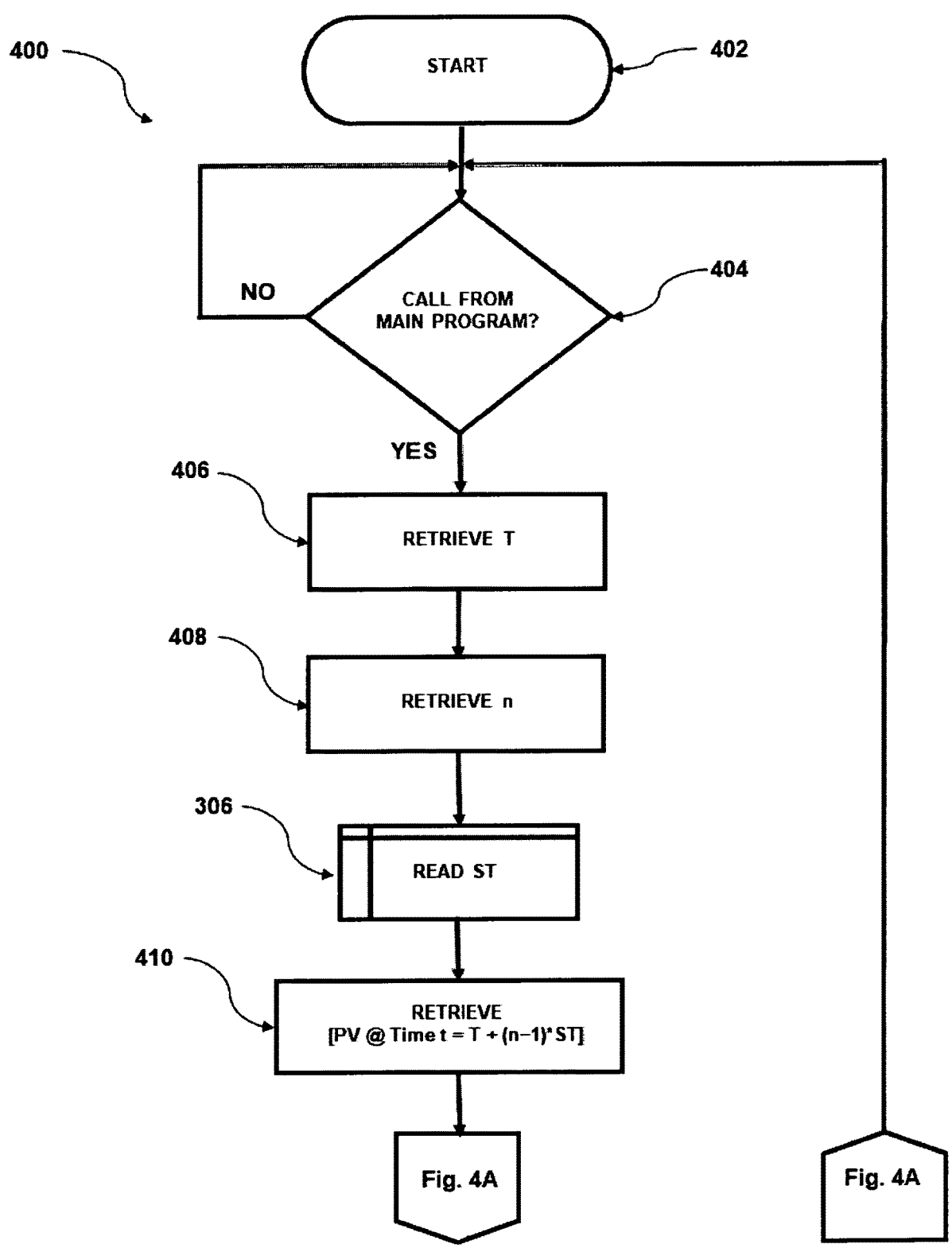
FIGS. 4, 4A, 4B, 4C, 4D, 4E, and 4F are flow charts depicting the process value subprogram (PV Subprogram) that calculates and returns to the MN Program the rate-of-change process value.
Figure 4A:
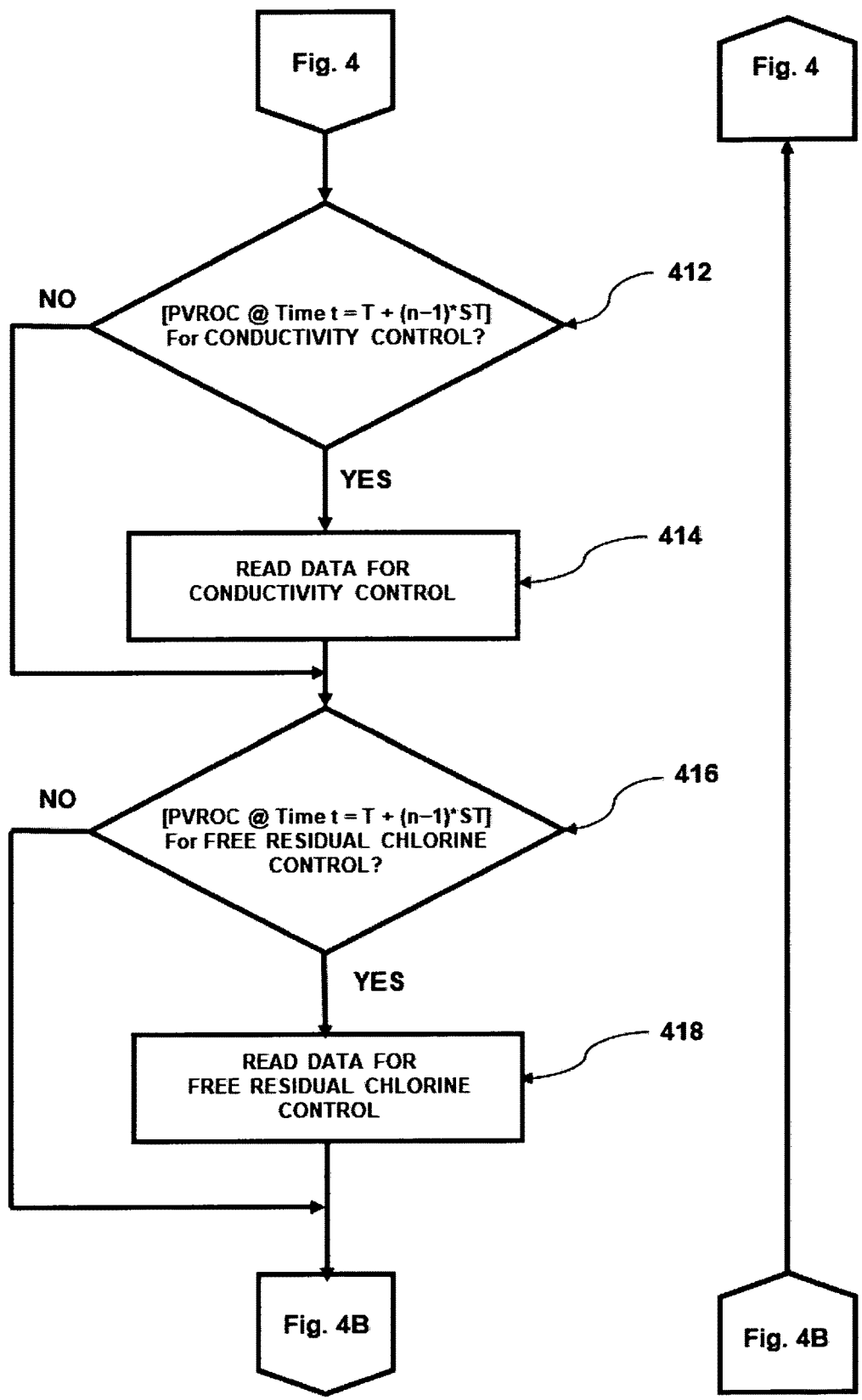
Figure 4B:
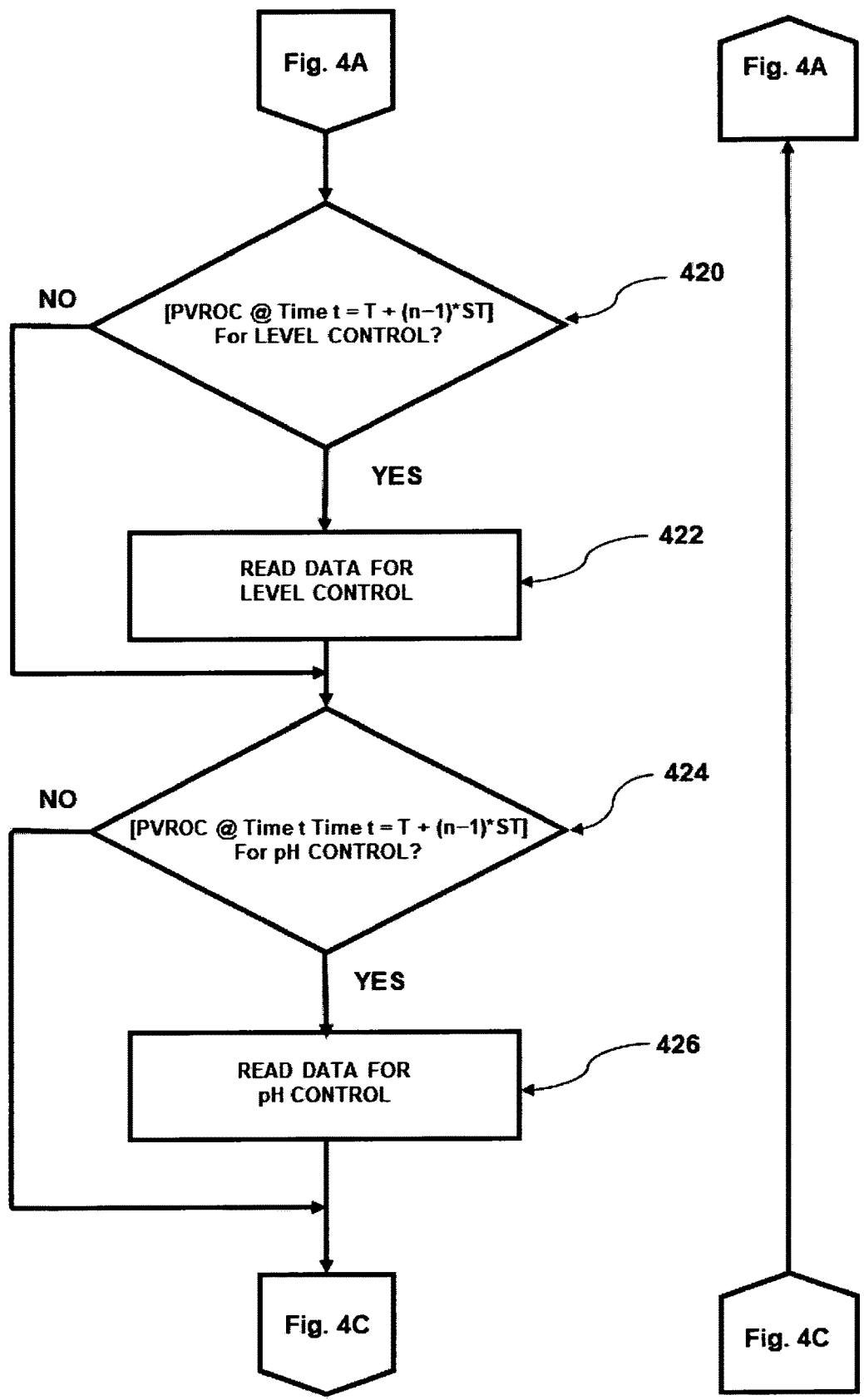
Figure 4F:
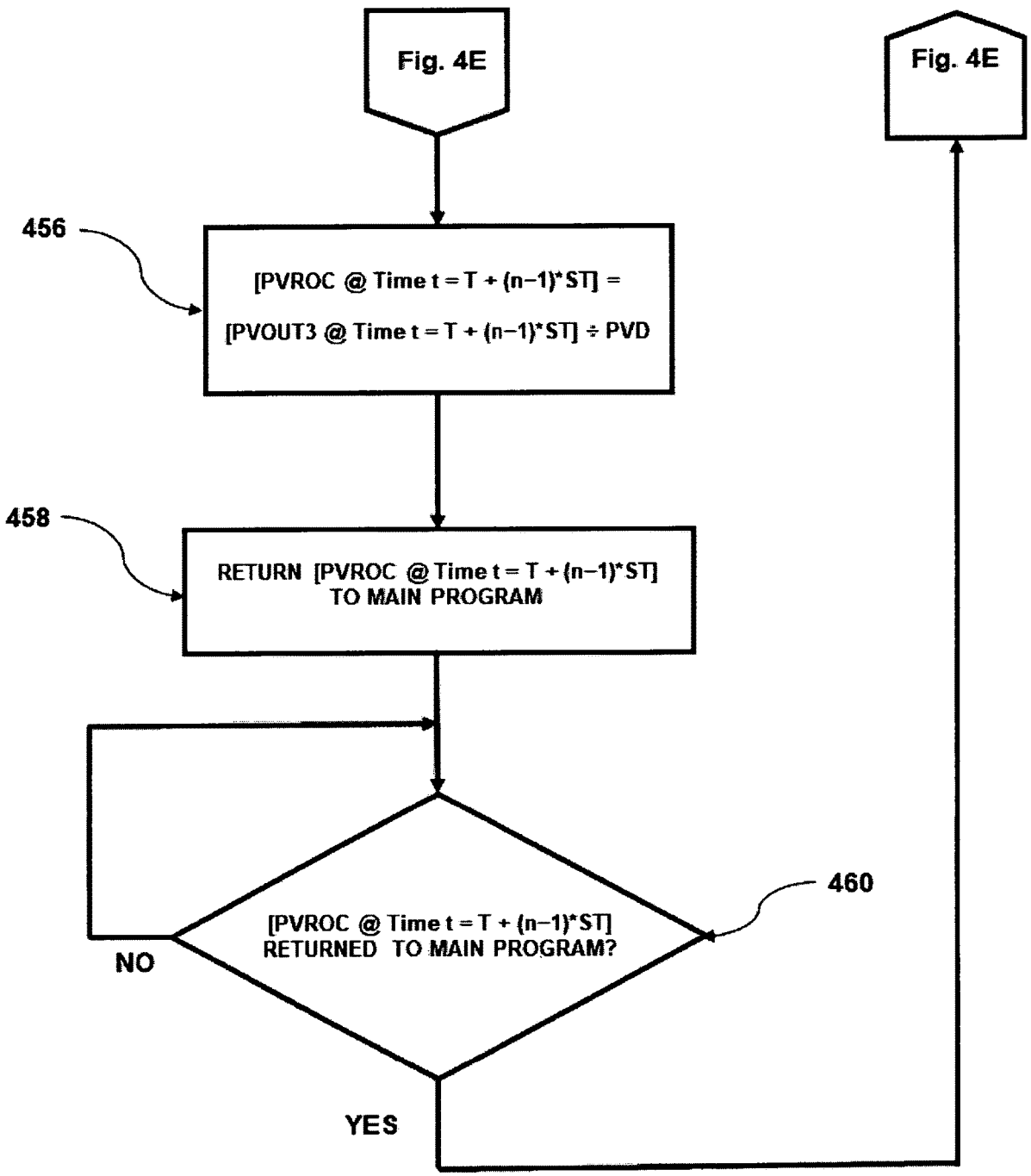
Figure 5:
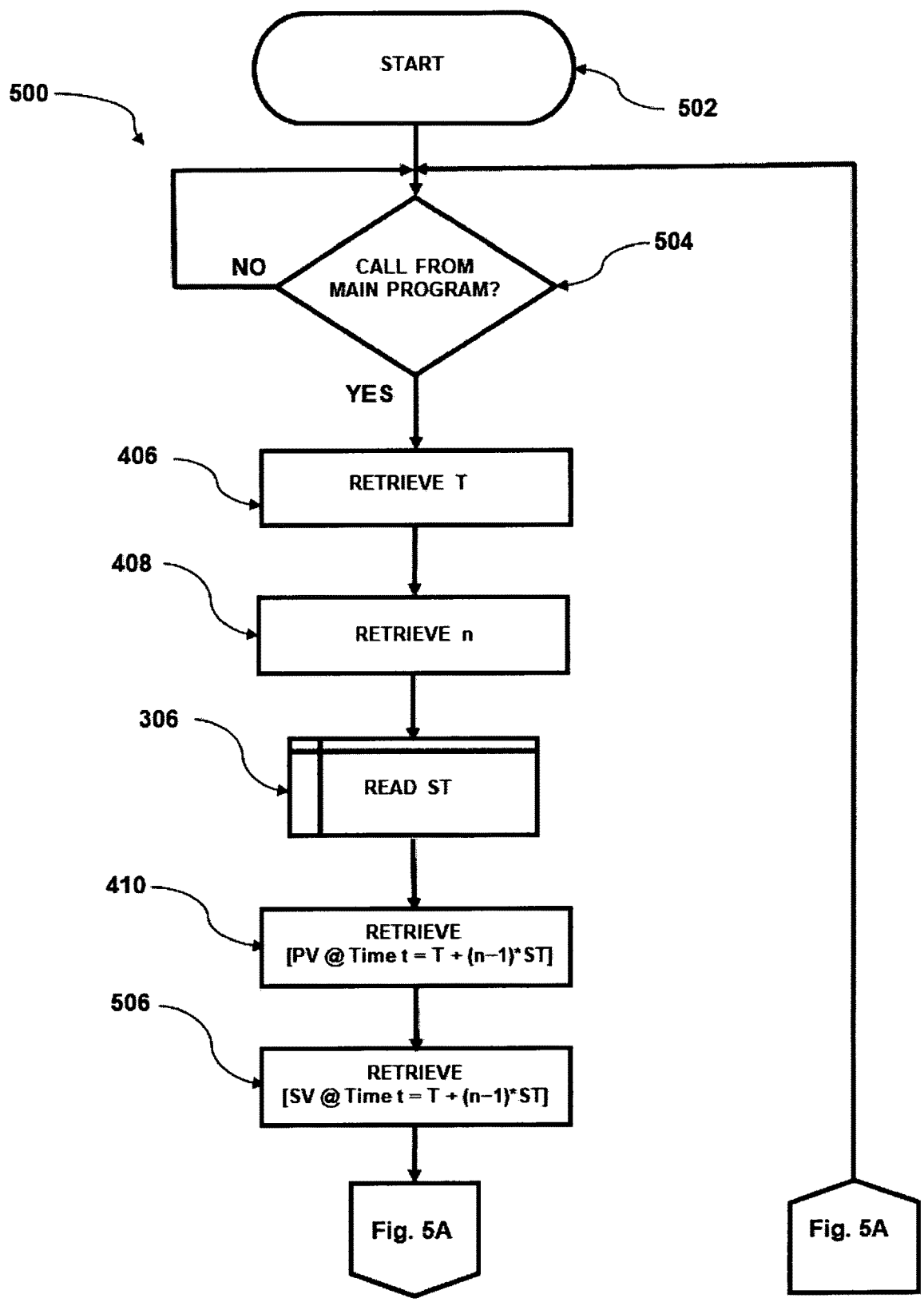
FIGS. 5, 5A, 5B, and 5C are flow charts showing the set value subprogram (SV Subprogram) that calculates and returns to the MN Program the rate-of-change set value.
Figure 6:
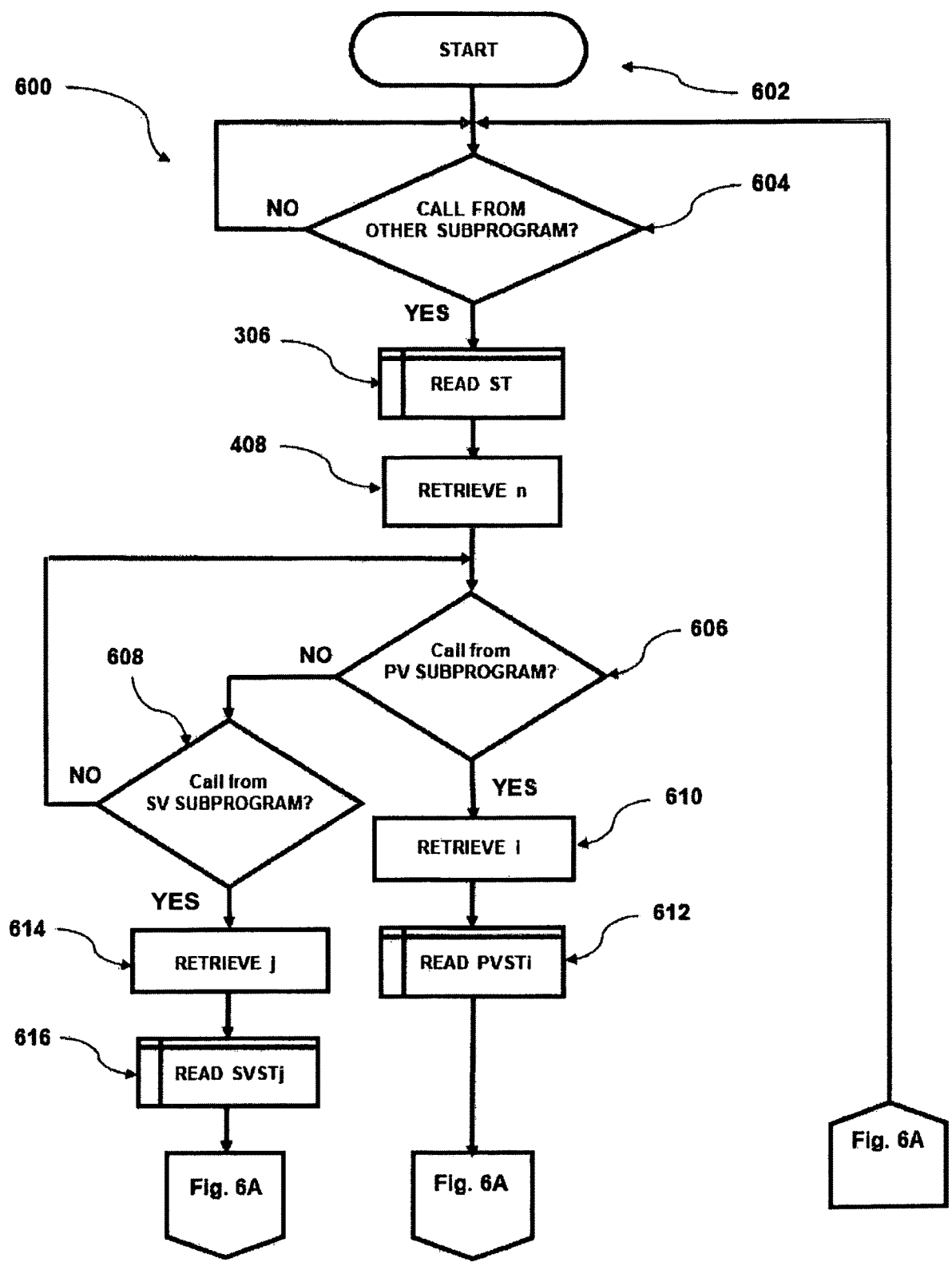
FIGS. 6, 6A, and 6B are flow charts illustrating the data smoothing subprogram (LV Subprogram) that calculates and returns the smoothed values to the PV Subprogram or SV Subprogram.

The algorithms disclosed here are illustrated in the flow charts, FIGS. 3 to 7, and described in detail in this disclosure. FIGS. 8 to 8D show data used by the algorithms. The first algorithm is depicted by FIGS. 3 to 3F. It gives instructions to the programmable PID controller to sample and save to memory the operational parameters, corresponding set values, and the manipulated values at uniform time intervals, to manage the transition from control based on set value and process value to that based on rate-of-change set value and rate-of-change process value. The second algorithm is illustrated in FIGS. 4 to 4F. It calculates a rate-of-change operational parameter for each operational parameter under control, including, but not limited to, conductivity, concentration of free residual chlorine, level, as pH. The second algorithm interacts with the first algorithm by sending the rate-of-change operational parameter to it. The third algorithm is shown by FIGS. 5 to 5D and FIGS. 7 to 7B. It calculates a rate-of-change set value from the preceding manipulated value for each of operational parameters under control and determines the proper sign, plus or minus, for the rate-of-change set value. The third algorithm interacts with the first algorithm by sending the rate-of-change set value to it. The fourth algorithm is illustrated by FIGS. 6 to 6B. It interacts with the second and third algorithms by calculating and sending to them smoothed values of the process value and the rate-of-change set value. Through PID control, the fifth algorithm reduces to a predetermined value the difference between the rate-of-change operational parameter and the rate-of-change set value by outputting the appropriate manipulated value to a control element.

The manipulated variable is electronically communicated to a control element; which is represented by an output ranging from 0 to 100%. The rate-of-change set value at t=T+(n−1)*ST determined from the manipulated value at t=T+(n−2)*ST is also greater than zero. When the process value is greater than the set value, the rate-of-change set value must be less than zero. In this situation, the invention outputs a rate-of-change set value that is the additive inverse of the rate-of-change set value determined from the manipulated value. With proper tuning of the PID controller and a rate-of-change set value less than zero, the PID controller will adjust the manipulated value so that the rate-of-change process value also approaches a value less than zero; i.e., the process value at time t=T+(n−1)*ST is less than the process value at time t=T+(n−2)*ST. This is the desired outcome. On the other hand, when the process value is less than the set value, the rate-of-change set value must be greater than zero; the same as that rate-of-change set value determined from the manipulated value. The PID controller will adjust the manipulated value so that the rate-of-change process value is also greater than zero; the process value at time t=T+(n−1)*ST is greater than the process value at time t=T+(n−2)*ST. Again, the desired outcome. When the process value is within preselected limits of the set value, the rate-of-change set value is zero. The PID controller will adjust the manipulated value so that the rate-of-change process value is also zero; the process value at time t=T+(n−1)*ST equals the process value at time t=T+(n−2)*ST. The desired outcome.

The invention works for both direct- and reverse-acting control. Those with skill in the art of process control know that the magnitude of the manipulated value is typically unaffected by the direction of control. In direct-acting control, an increasing process value requires an increase in the control element—i.e., control valve opening or variable stroke pump increasing—to reduce the difference between the process value and set value. This is known as "air or signal to open." pH and conductivity are direct-acting; i.e., as pH increases more acid must be added and as conductivity increases more water must be released from the basin as blowdown. For reverse-acting control, an increasing process value requires a decrease in the control element—i.e., control valve closing or variable stroke pump decreasing—to reduce the difference between the process value and set value. This is known as "air or signal to close." Free residual chlorine and level are reverse-acting; i.e., increasing chlorine level requires adding less chlorine-containing chemical and increasing level requires less makeup water.

Figure 2:
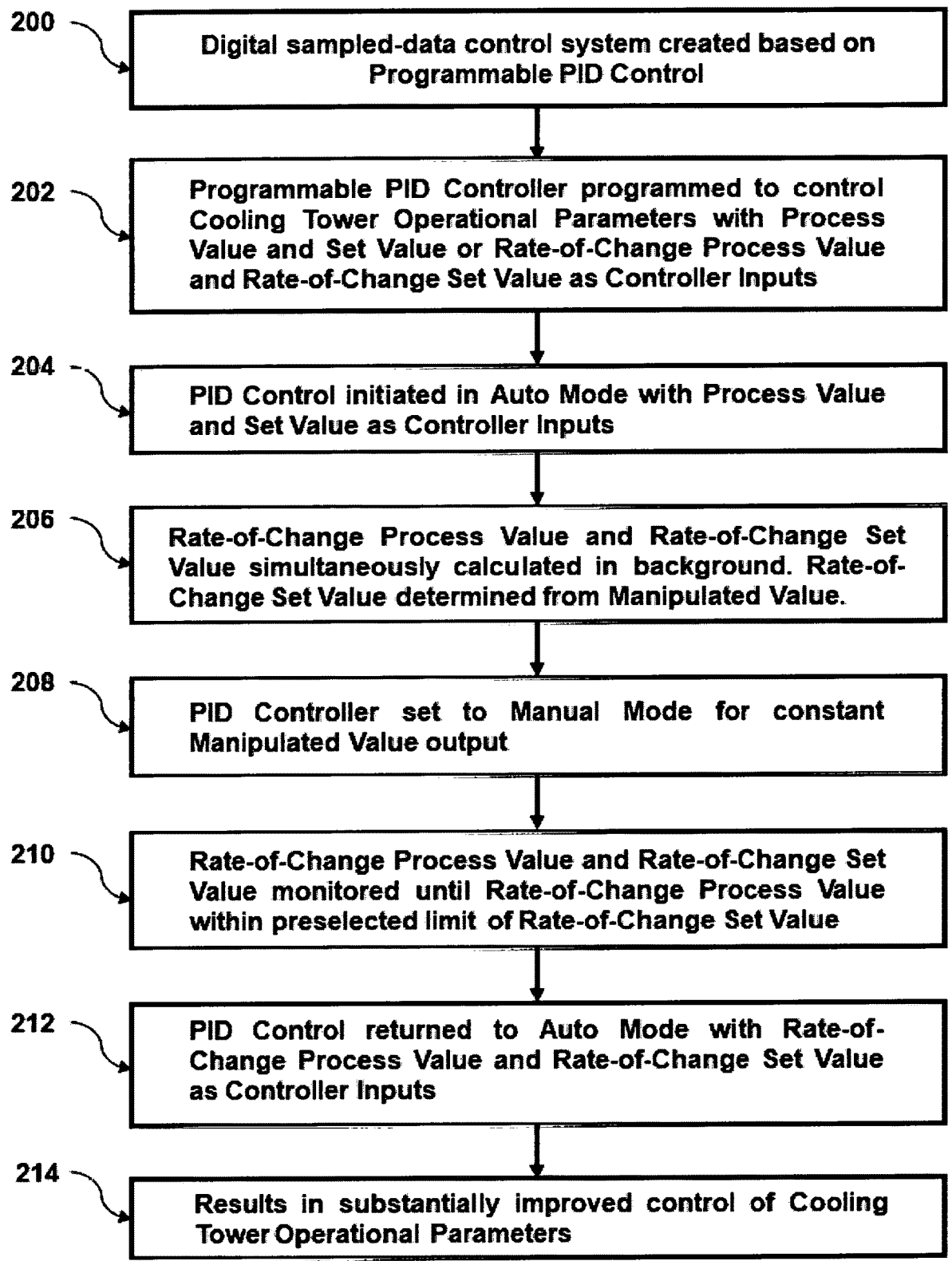
FIG. 2 is a flowchart giving an overview of how the actual rate-of-change of the conductivity, free residual chlorine, level, and pH process values are controlled to achieve their corresponding rate-of-change set points.

A brief overview of the disclosed control strategy is shown in FIG. 2, a flow chart more particularly described by additional disclosed flow charts. In step 200, a digital sampled-data control system is created. In step 202, A programmable PID controller is programmed to control the operational parameters with either the sampled process value and simultaneously sampled set value as inputs to the controller, or the calculated rate-of-change process value and simultaneously calculated rate-of-change set value as inputs. At step 204, the controller is set to automatic mode and control of any one or more of the operational parameters is initiated with the sampled process values and corresponding sampled set values as controller inputs with PID control. In step 206, the rate-of-change process value and rate-of-change set value representing each of one or more of the operational parameters are calculated as though they are inputs to the controller; but are kept in the background. The rate-of-change set value is determined from the preceding outputted manipulated value from the controller.

After some time controlling the operational parameters using the sampled process value and set value as inputs to the PID controller, the user decides to transition to control using rate-of-change process value and rate-of-change set value as controller inputs. In step 208, the user switches the controller to manual mode and adjusts the controller for safe and stable operation for a limited period of time at constant manipulated value output. During this period, in step 210, the user monitors the rate-of-change process value and rate-of-change set value at constant manipulated value output until the rate-of-change process value is within preselected limit of the rate-of-change set value. In step 212, when the rate-of-change process value is within the preselected limit of the rate-of-change set value for the particular operational parameter under control, the PID controller is returned to automatic mode with the rate-of-change process value and rate-of-change set value as controller inputs. In the step 214, the result is substantially improved control of each of the operational parameters selected for control with rate-of-change process value and rate-of-change set value as inputs to the controller.

300 in FIGS. 3, 3A, 3B, 3C, 3D, and 3E, and 3F is a flow chart of the main program. The main program is resident in the programmable PID controller. It provides the data needed for other subprograms and, through communicating with subprograms, communicates the rate-of-change process value and rate-of-change set value to the PID controller. It is to be understood that the flow chart 300 of the main program applies to programmable PID controllers 116, 118, 120, and 122.

Figure 8:
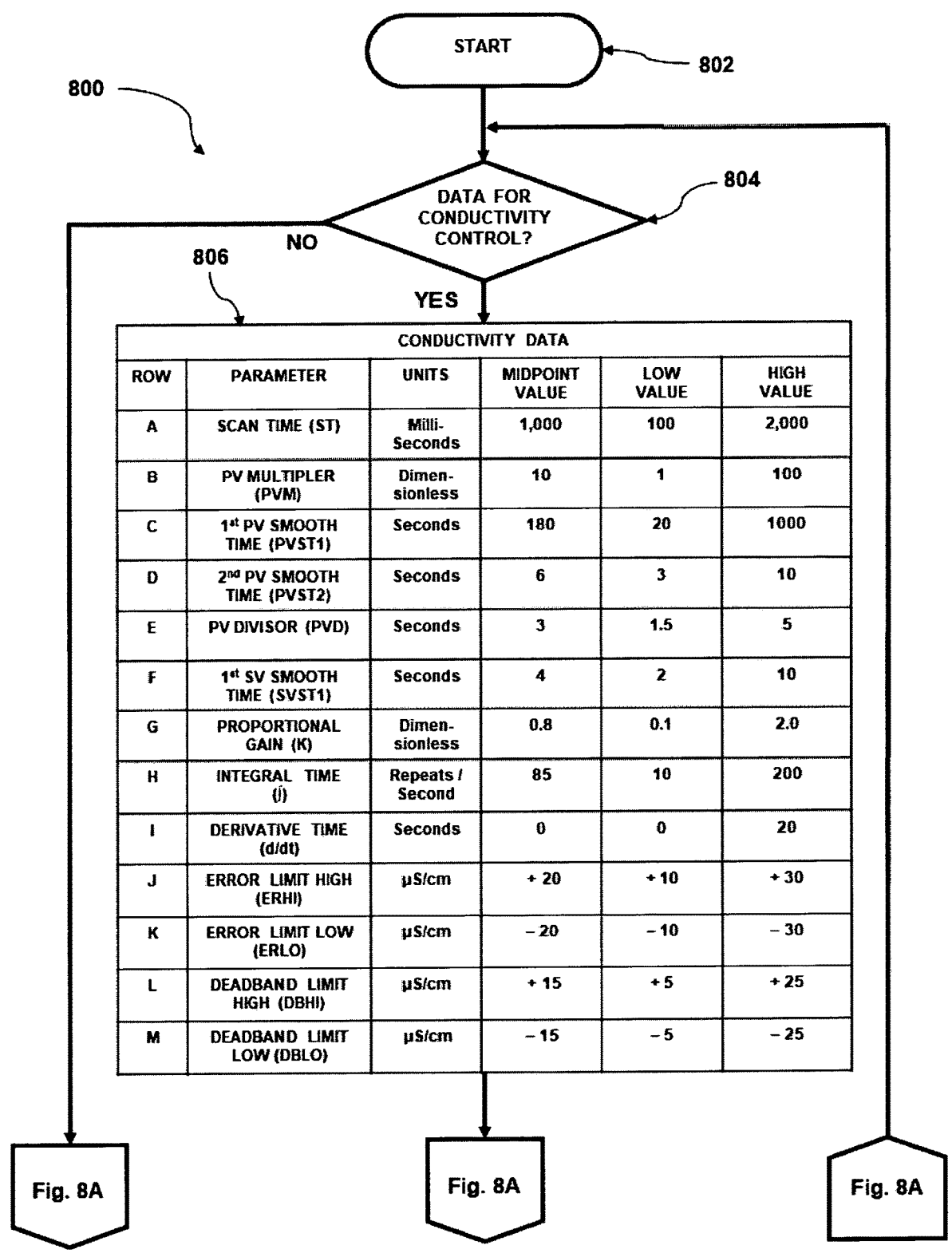
FIGS. 8, 8A, 8B, 8C, and 8D are flow charts showing the data used throughout the MN Program and subprograms.
Figure 8A:
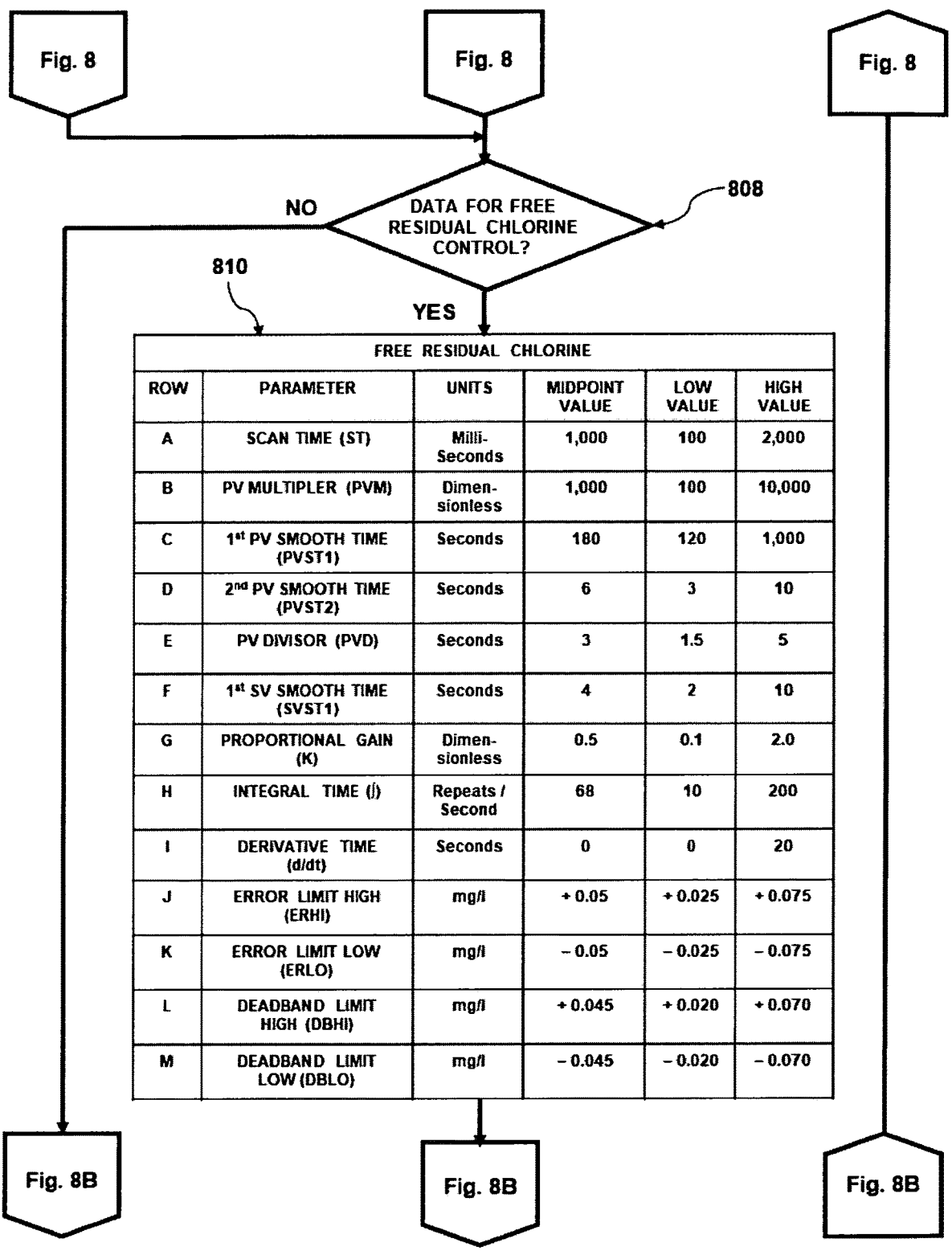
Figure 8B:
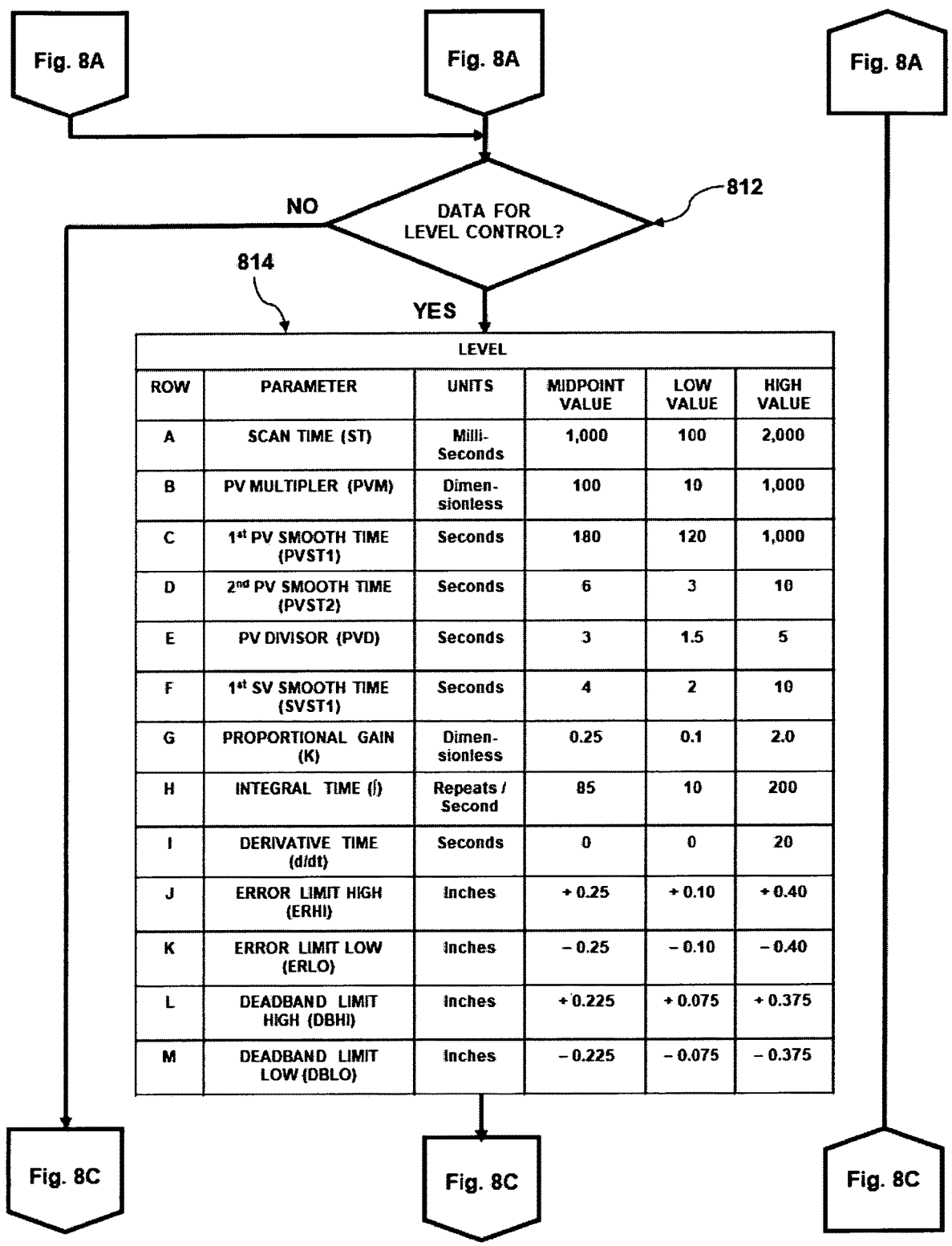
Figure 8C:
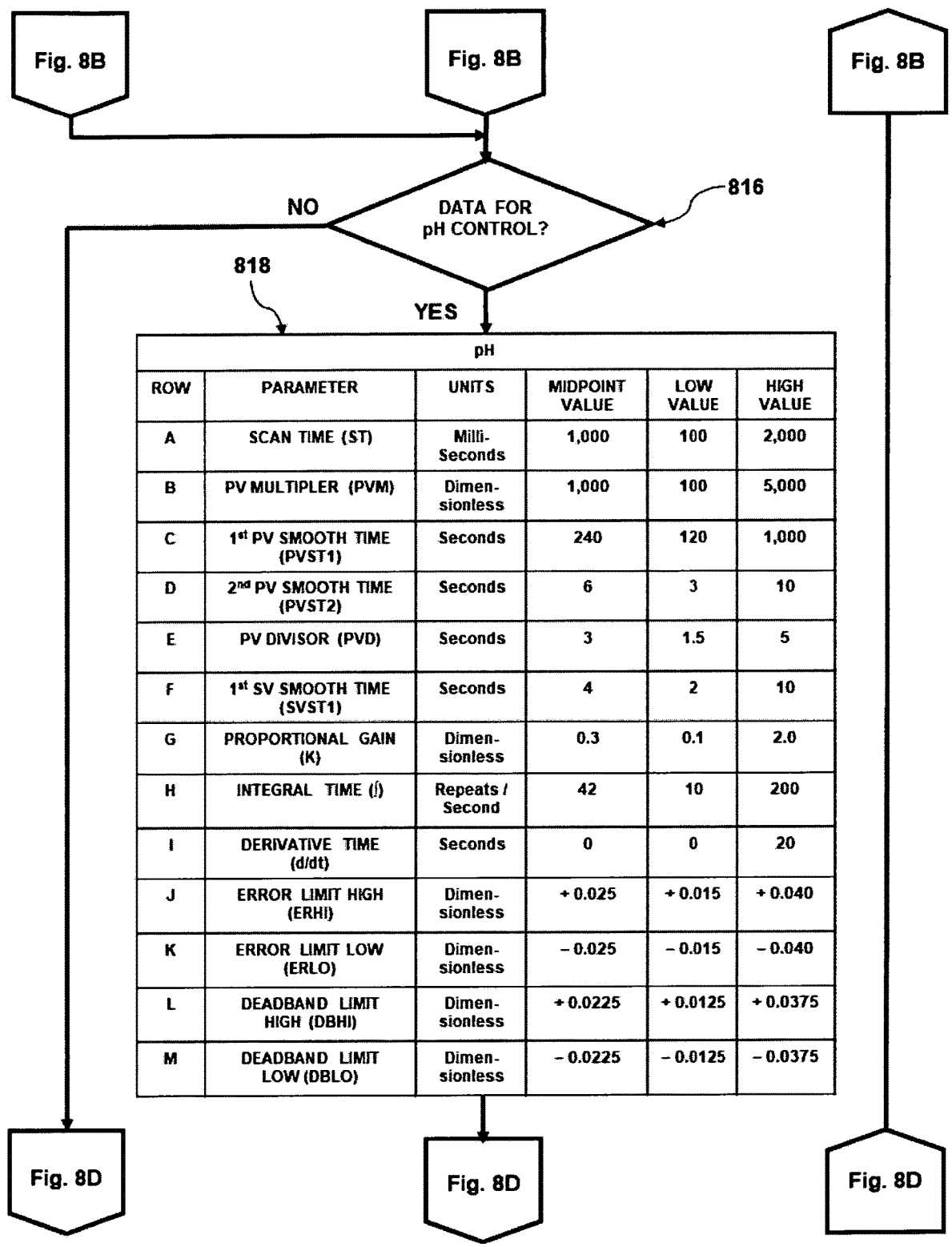

Referring to FIG. 3, step 302 represents energizing 116, 118, 120, and 122. In step 304, an arbitrary time T is set on energizing. In step 306, ST is read from row A in table 806 in FIG. 8 for 116, row A in table 810 in FIG. 8A for 120, row A in table 814 in FIG. 8B for 122, and row A in table 818 in FIG. 8C for 118. Tables 806, 810, 814, and 818 show ST may range from a low value of 100 to high value of 2,000 milliseconds, with midpoint values of 1,000 milliseconds. ST may differ for each controller.

Throughout the disclosure, the midpoint values in tables 806, 810, 814, or 818 refer to data for initial provisioning of 116, 118, 120, and 122. But any value greater than or equal to the low value and less than or equal to the high value may provide better control in a given control environment.

In step 308, counter "n" is set to 1. In step 310, time t=T+(n−1)*ST. In step 312, the process value is sampled, and the set value in step 316, both at time t=T+(n−1)*ST. The sampled process value and set value are represented throughout the disclosure as [PV @ Time t=T+(n−1)*ST] and [SV @ Time t=T+(n−1)*ST], or [PV @ Time t=T+(n−2)*ST] and [SV @ Time t=T+(n−2)*ST], respectively. [PV @ Time t=T+(n−1)*ST] and [SV @ Time t=T+(n−1)*ST] are saved to memory in steps 314 and 318.

Those with skill in the art of sampled data process control understand that a process value or set value sampled and saved to memory at a time t=T+(n−1)*ST, such as [PV @ Time t=T+(n−1)*ST] or [SV @ Time t=T+(n−1)*ST], or a calculated variable, such as [PVROC @ Time t=T+(n−1)*ST] or [SVROC @ Time t=T+(n−1)*ST] and saved to memory is the same sampled data or calculated variable at Time t=T+(n−2)*ST when retrieved from memory after counter "n" has been incremented by 1.

In step 322, the main program checks if the user has decided to transition to rate-of-change based control. If yes, in step 324 "ROC Transition" is switched to ON and in FIG. 3A, user selects manual control mode, step 394. Otherwise, step 324 and step 394 are bypassed meaning that the user has not yet decided to transition to control using rate-of-change process value and rate-of-change set value as controller inputs.

Figure 3A:
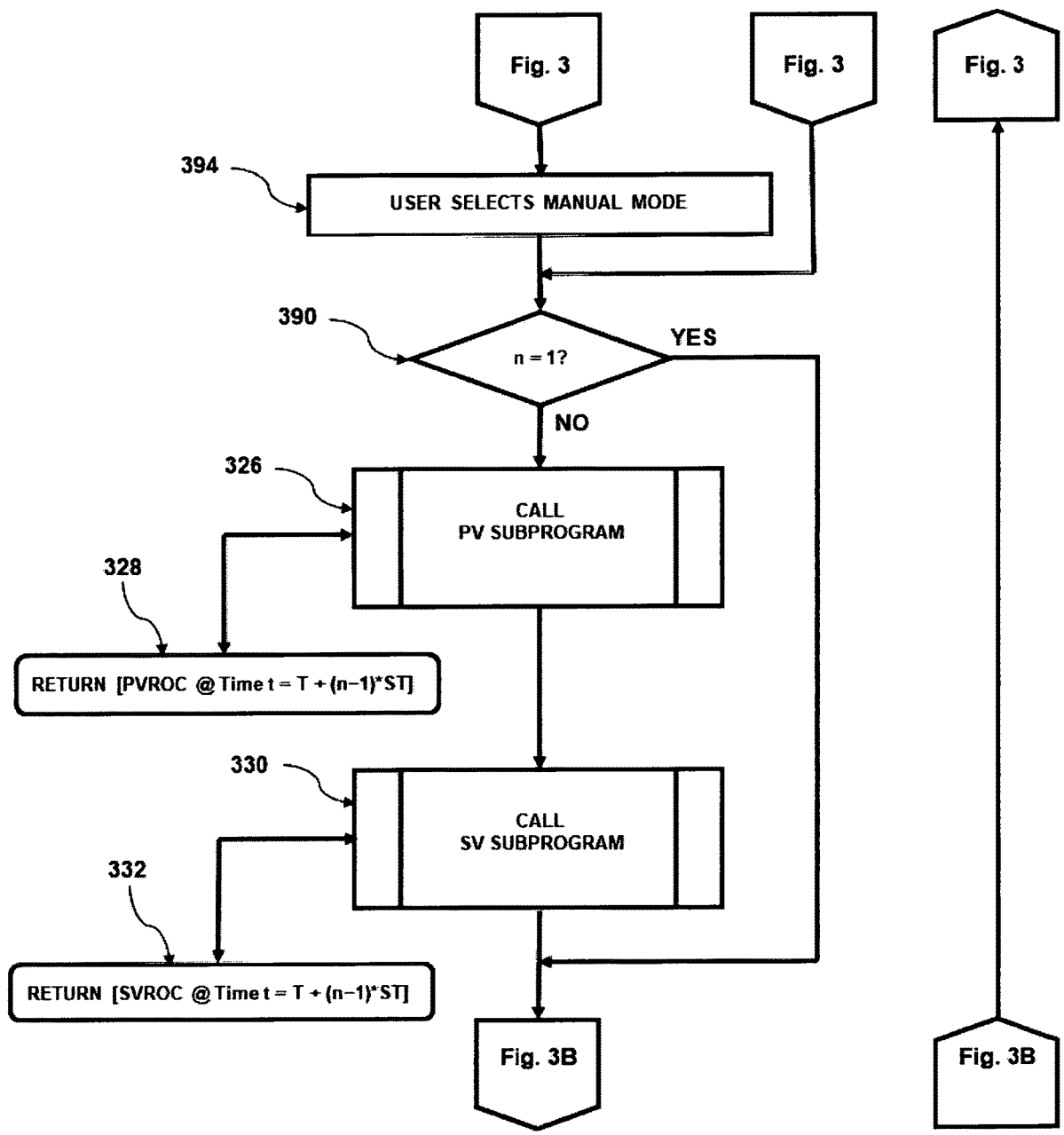

In step 390 in FIG. 3A, counter "n" is checked if equal to 1. Counter "n" must be greater than 1 to ensure that there is at least one manipulated value preceding the first determination of [SVROC @ Time t=T+(n−1)*ST]. If n=1, steps 326, 328, 330, and 332 are bypassed. For any n>1, in step 326, MN Program calls the PV Subprogram. In step 328, the PV Subprogram returns [PVROC @ Time t=T+(n−1)*ST] for the given value of counter "n". In step 330 MN Program calls the SV Subprogram. In step 332, SV Subprogram returns [SVROC @ Time t=T+(n−1)*ST] for the given counter "n". The PV Subprogram and SV Subprogram are described more fully below.

Rate-of-change process value for any operational parameter at time t is represented by [PVROC @ Time t=T+(n−1)*ST] and rate-of-change set value for any operational parameter at time t by [SVROC @ Time t=T+(n−1)*ST] throughout the rest of the disclosure. It is to be understood that [PVROC @ Time t=T+(n−1)*ST] and [SVROC @ Time t=T+(n−1)*ST] may represent any operational parameter; including, each of conductivity, concentration of free residual chlorine, level, and pH.

Figure 3B:
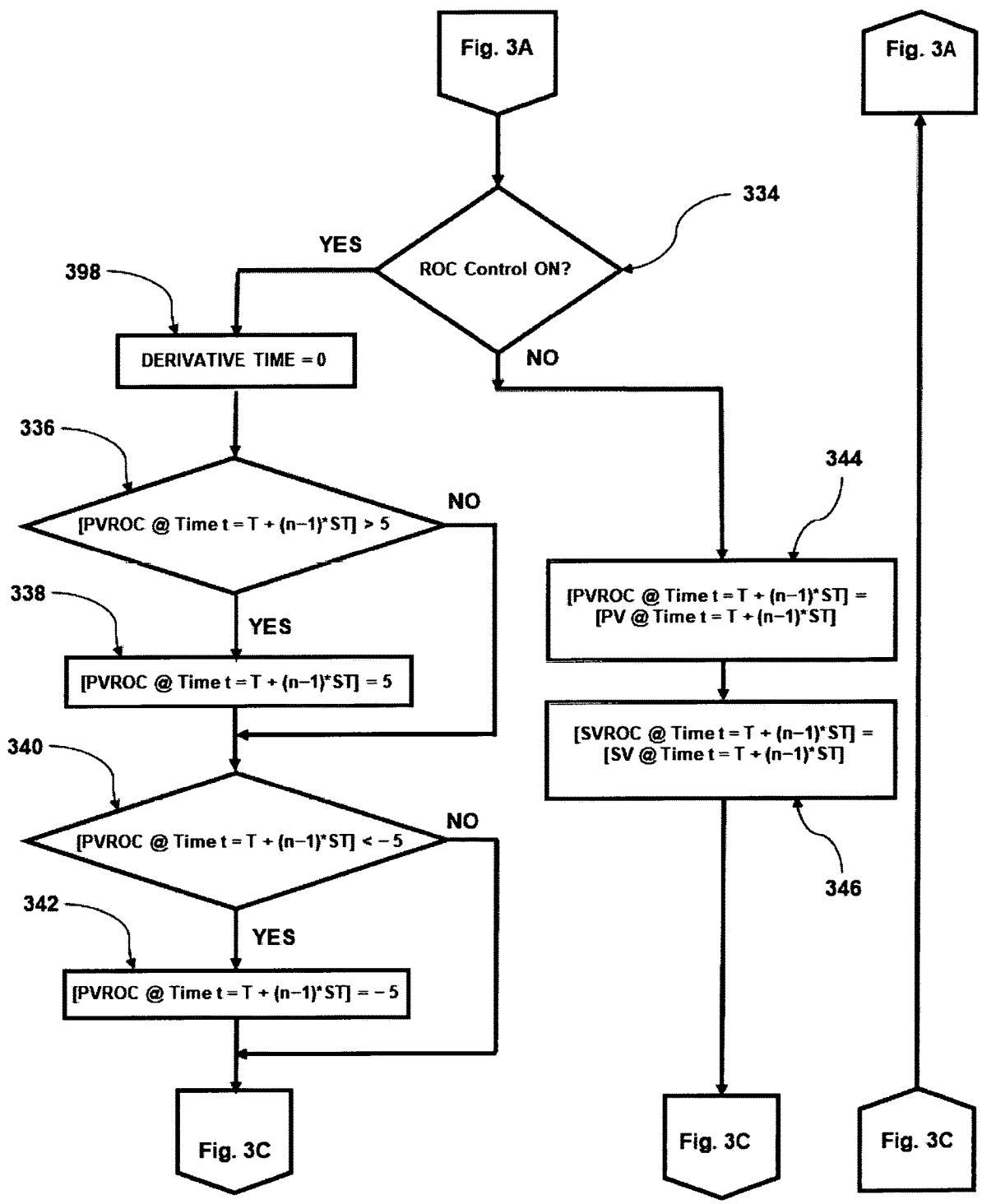

Referring to FIG. 3B, in step 334, MN Program checks if the user has selected that the inputs to the PID controller are to be [PVROC @ Time t=T+(n−1)*ST] and [SVROC @ Time t=T+(n−1)*ST]. If not, step 344 the rate-of-change process value at time t, [PVROC @ Time t=T+(n−1)*ST], is set equal to [PV @ Time t=T+(n−1)*ST] and in step 346, rate-of-change set value at time t, [SVROC @ Time t=T+(n−1)*ST], is set equal to [SV @ Time t=T+(n−1)*ST]. This indicates that operational parameters are being controlled with the sampled process value and set value as inputs to the controller.

Figure 3C:
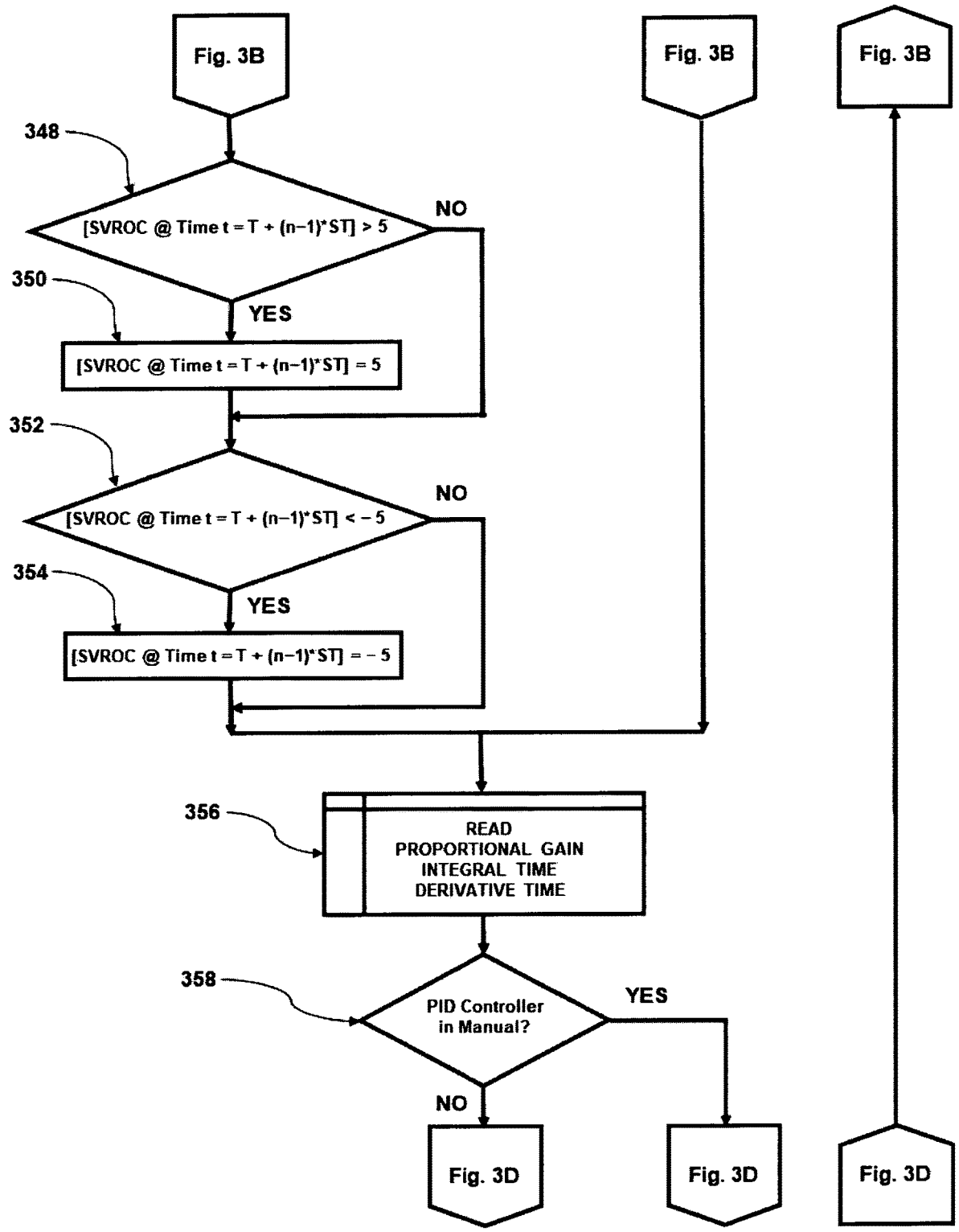

If rate-of-change control is on, step 334 directs the program to steps 398, 336, 338, 340, and 342 in FIG. 3B and steps 348, 350, 352, and 354 in FIG. 3C. In step 398, the derivative time is set to 0. In steps 336, 338, 340, and 342, [PVROC @ Time t=T+(n−1)*ST] is set to no greater than +5 or no less than −5. In step 336, [PVROC @ Time t=T+(n−1)*ST] is checked if greater than +5, if so in step 338 [PVROC @ Time t=T+(n−1)*ST] is set equal to +5. If not, step 338 is bypassed. In step 340, [PVROC @ Time t=T+(n−1)*ST] is checked if less than −5, if so in step 342 [PVROC @ Time t=T+(n−1)*ST] is set equal to −5. The same is done for [SVROC @ Time t=T+(n−1)*ST] in steps 348, 350, 352, and 354 in FIG. 3B. In step 348, [SVROC @ Time t=T+(n−1)*ST] is checked if greater than +5, if so in step 350 [SVROC @ Time t=T+(n−1)*ST] is set equal to +5. If not, step 350 is bypassed. In step 352, [SVROC @ Time t=T+(n−1)*ST] is checked if less than −5, if so in step 354 [SVROC @ Time t=T+(n−1)*ST] is set equal to −5.

Figure 3D:
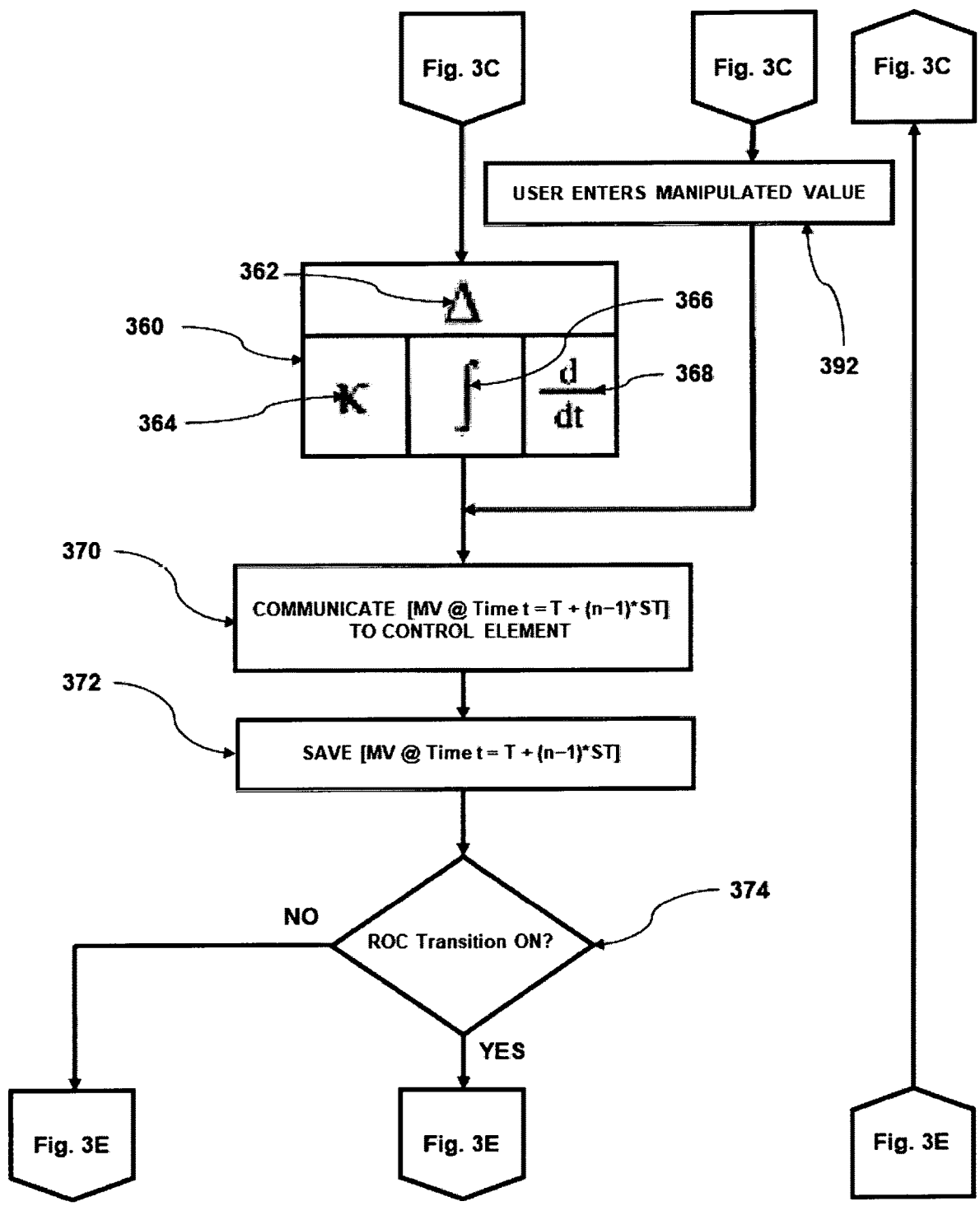
Figure 3E:
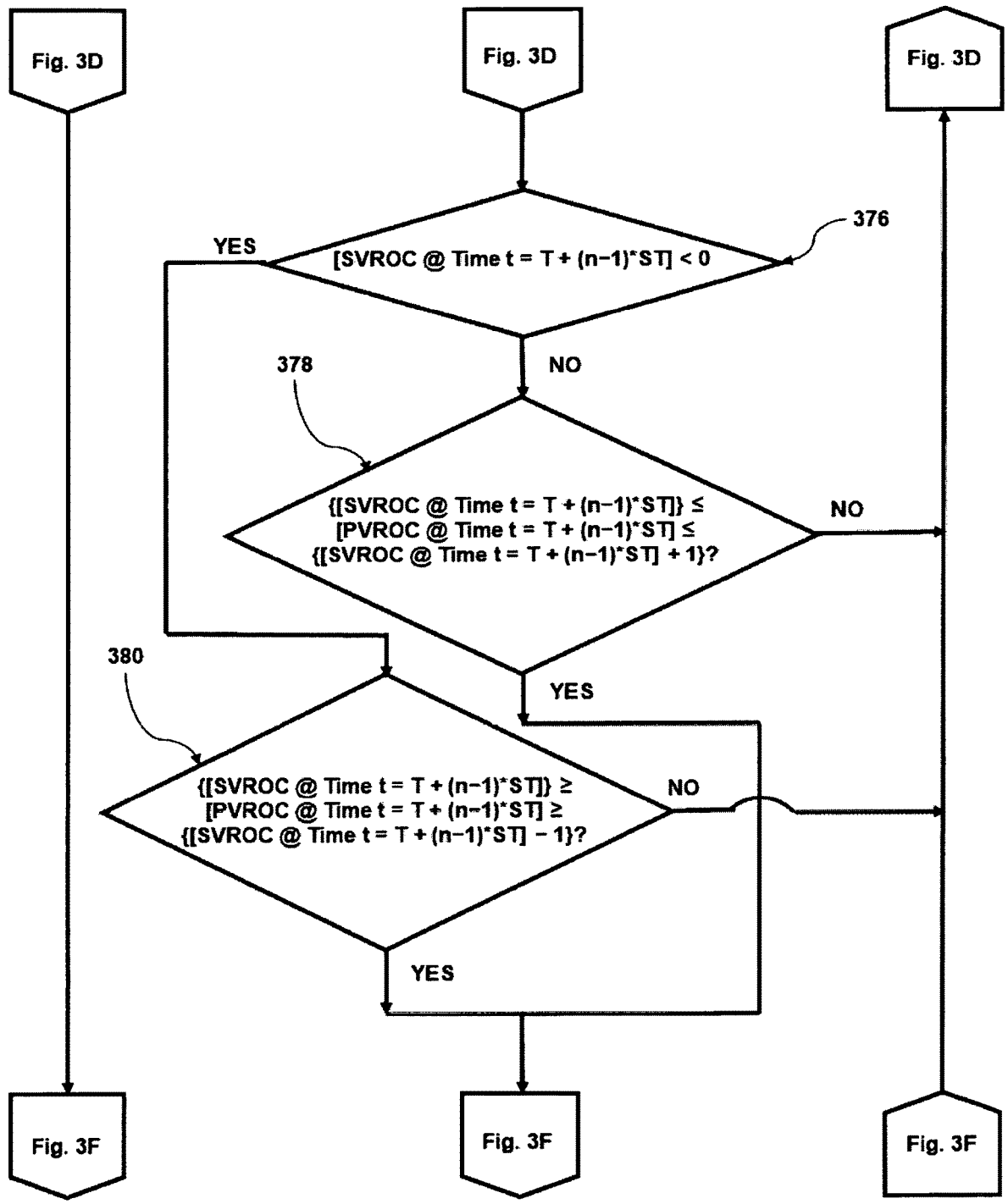

Controller 360 in FIG. 3D, represents the PID controller embedded in each of programmable PID controllers 116, 120, 122, and 118 in FIG. 1. Whether or not the control is based on [PVROC @ Time t=T+(n−1)*ST] and [SVROC @ Time t=T+(n−1)*ST] or [PV @ Time t=T+(n−1)*ST] and [SV @ Time t=T+(n−1)*ST], in step 356 in FIG. 3C, 300 reads from row G in tables 806, 810, 814, and 818 the proportional gain, dimensionless, for 116, 120, 122, and 118, respectively. For 116, proportional gain may range from 0.1 to 2.0, with midpoint value 0.8; for 120 it ranges from 0.1 to 2.0, with midpoint value 0.5; for 122 it ranges from 0.1 to 2.0, with midpoint value 0.25; and for 118 it ranges from 0.1 to 2.0, with midpoint value 0.3. Program 300 reads from row H in tables 806, 810, 814, and 818 the integral time, in repeats per second, for 116, 120, 122, and 118, respectively. For 116, integral time may range from 10 to 200, with midpoint value 85; for 120 it ranges from 10 to 120, with midpoint value 68; for 122 it ranges from 10 to 200, with midpoint value 85; and for 118 it ranges from 10 to 200, with midpoint value 42. Program 300 reads from row I in tables 806, 810, 814, and 818 the derivative time, in seconds, for 116, 120, 122, and 118, respectively. For all controllers operating with [PVROC @ Time t=T+(n−1)*ST] and [SVROC @ Time t=T+(n−1)*ST] as inputs, the derivative time is 0, the midpoint value. Whenever a controller is operating with [PV @ Time t=T+(n−1)*ST] and [SV @ Time t=T+(n−1)*ST] as inputs, the derivative time may be up to the high value, 20 seconds.

The terms, "gain," "proportional band," or "proportional gain," appropriately scaled, may be used to represent the data in row G in tables 806, 810, 814, or 818. The integral time in row H in tables 806, 810, 814, and 818 may be measured as repeats per second, seconds per repeat, minutes per repeat, or repeats per minute, all with appropriate magnitude based on dimensions. The derivative time in row I in tables 806, 810, 814, and 818 can be expressed in seconds or minutes.

In step 358, it is confirmed if controller 360 is in manual mode. In step 392, if controller 360 is in manual mode, the user sets the manipulated value, [MV @ Time t=T+(n−1)*ST]. In this instance, controller 360 is bypassed.

If controller 360 is in automatic mode, the difference between [PVROC @ Time t=T+(n−1)*ST] and [SVROC @ Time t=T+(n−1)*ST] is calculated in the controller as represented by 362. If control is based on [PV @ Time t=T+(n−1)*ST] and [SV @ Time t=T+(n−1)*ST], [PVROC @ Time t=T+(n−1)*ST] and [SVROC @ Time t=T+(n−1)*ST] were previously set to these values in steps 344 and 346, respectively. Using the proportional band, 364, integral time, 366, and derivative time, 368, obtained from tables 806, 810, 814, or 818, controller 360 calculates the manipulated value at time t, [MV @ Time t=T+(n−1)*ST]. In step 370 [MV @ Time t=T+(n−1)*ST] is communicated to the control element for each controller. For conductivity controller 116, [MV @ Time t=T+(n−1)*ST] represents MVC 142 communicated to control element 124. For pH controller 118, [MV @ Time t=T+(n−1)*ST] represents MVP 150 communicated to control element 152. For chlorine controller 120, [MV @ Time t=T+(n−1)*ST] represents MVF 146 communicated to control element 154. For level controller

122, [MV @ Time t=T+(n−1)*ST] represents MVL 148 communicated to control element 156. In step 372, [MV @ Time t=T+(n−1)*ST] for each controller is saved to memory.

In step 374, 300 checks if the user has previously decided to transition from control based on [PV @ Time t=T+(n−1)*ST] and [SV @ Time t=T+(n−1)*ST] to control based on [PVROC @ Time t=T+(n−1)*ST] and [SVROC @ Time t=T+(n−1)*ST]. If so, in steps 376, 378, and 380, MN Program checks whether [PVROC @ Time t=T+(n−1)*ST] is within the predetermined limit of [SVROC @ Time t=T+(n−1)*ST], sufficient to select control based on [PVROC @ Time t=T+(n−1)*ST] and [SVROC @ Time t=T+(n−1)*ST].

In step 376 [SVROC @ Time t=T+(n−1)*ST] is checked if less than 0. If so, in step 380, [PVROC @ Time t=T+(n−1)*ST] is checked if it is less than [SVROC @ Time t=T+(n−1)*ST] and greater than [SVROC @ Time t=T+(n−1)*ST]−1. If it is not, the main program returns to step 320. If in step 376, [SVROC @ Time t=T+(n−1)*ST] is greater than or equal to 0, in step 378, [PVROC @ Time t=T+(n−1)*ST] is checked if it is greater than [SVROC @ Time t=T+(n−1)*ST] and less than [SVROC @ Time t=T+(n−1)*ST]+1. If it is not, the main program returns to step 320. In these instances, [PVROC @ Time t=T+(n−1)*ST] is not within the predetermined limit of [SVROC @ Time t=T+(n−1)*ST], sufficient to select control based on [PVROC @ Time t=T+(n−1)*ST] and [SVROC @ Time t=T+(n−1)*ST].

If [PVROC @ Time t=T+(n−1)*ST] is within the predetermined limit of [SVROC @ Time t=T+(n−1)*ST], sufficient to select control based on [PVROC @ Time t=T+(n−1)*ST] and [SVROC @ Time t=T+(n−1)*ST]. and [SVROC @ Time t=T+(n−1)*ST], rate-of-change control is selected to ON in step 382 and rate-of-change transition is selected to OFF in step 384. In step 396, the user selects automatic control mode.

Step 386 checks if MN Program has been stopped. If so, it is stopped in step 388. If not, counter "n" is incremented by 1 in step 320 and a new time t=T+(n−1)*ST with n=n+1 is calculated in step 320.

With the new counter n=n+1, new time t is calculated from the equation t=T+(n−1)*ST with the incremented counter "n" and 300 repeats until the user stops the main program in steps 386 and 388.

400 in FIGS. 4, 4A, 4B, 4C, 4D, 4E, and 4F is a flow chart of the PV Subprogram common to all controllers, 116, 118, 120, and 122. It calculates and returns [PVROC @ Time t=T+(n−1)*ST] to the main program. Step 402 represents activation of 400. Once activated, PV Subprogram waits at step 404 for a request from MN Program 300. If the request is received, at step 404, T, step 406, and counter "n", step 408, are retrieved from 300. In step 306, ST is read from row A in tables 806, 810, 814, and 818 for each controller. In step 410, [PV @ Time t=T+(n−1)*ST] is retrieved from the value saved in step 314. In steps 412, 416, 420, or 424 in FIGS. 4A and 4B, PV Subprogram checks for which controller, 116, 118, 120, or 122, the [PVROC @ Time t=T+(n−1)*ST] is to be calculated. If for the conductivity controller, in step 414 data for calculating [PVROC @ Time t=T+(n−1)*ST] is acquired from rows B, C, D, and E in table 806. The same is done for free residual chlorine control, step 418, from table 810; level, step 422, from table in 814; and pH, step 426, from table 818. Each of rows B, C, D, and E show low, high, and midpoint values for each data point.

Figure 4C:
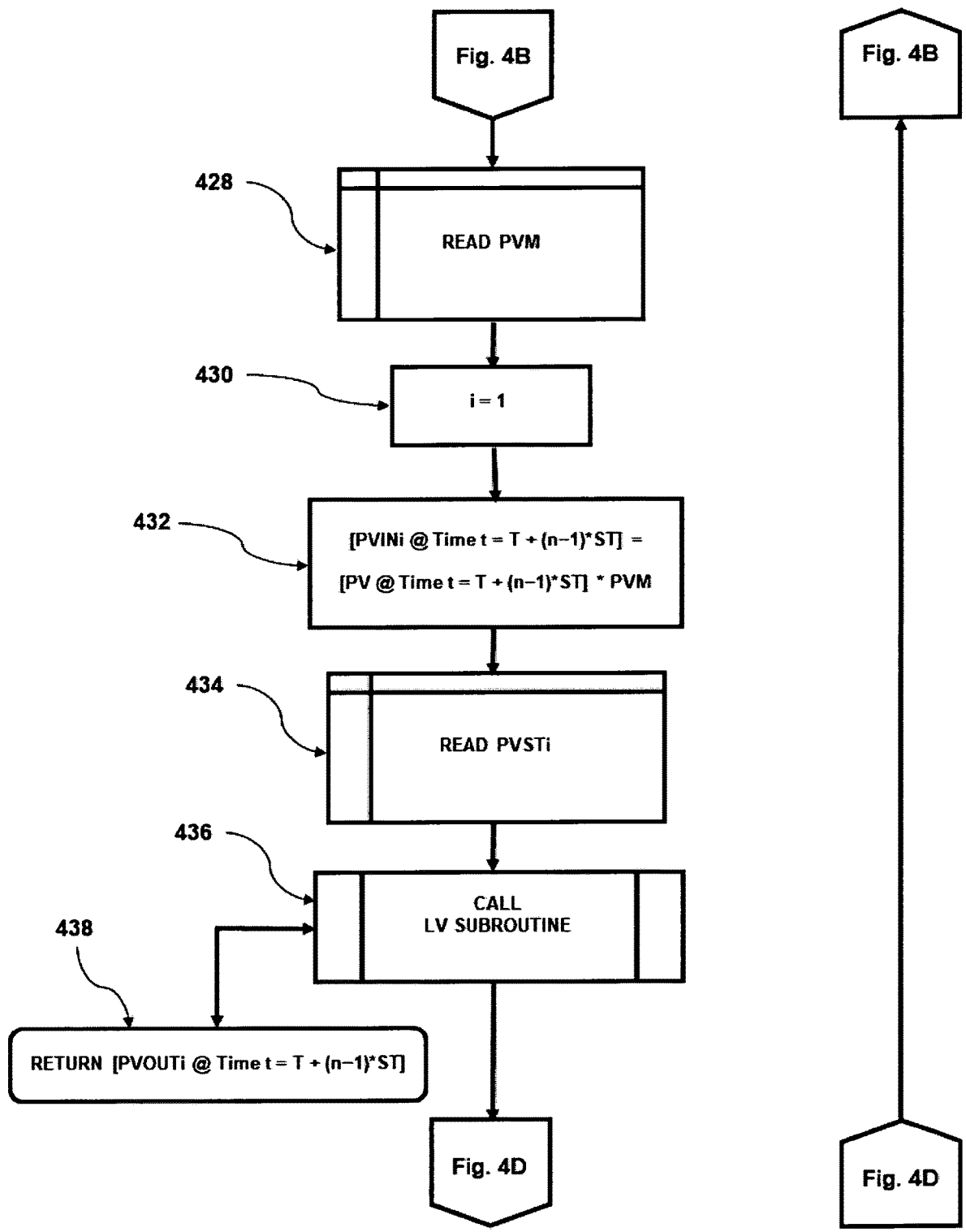
Figure 4D:
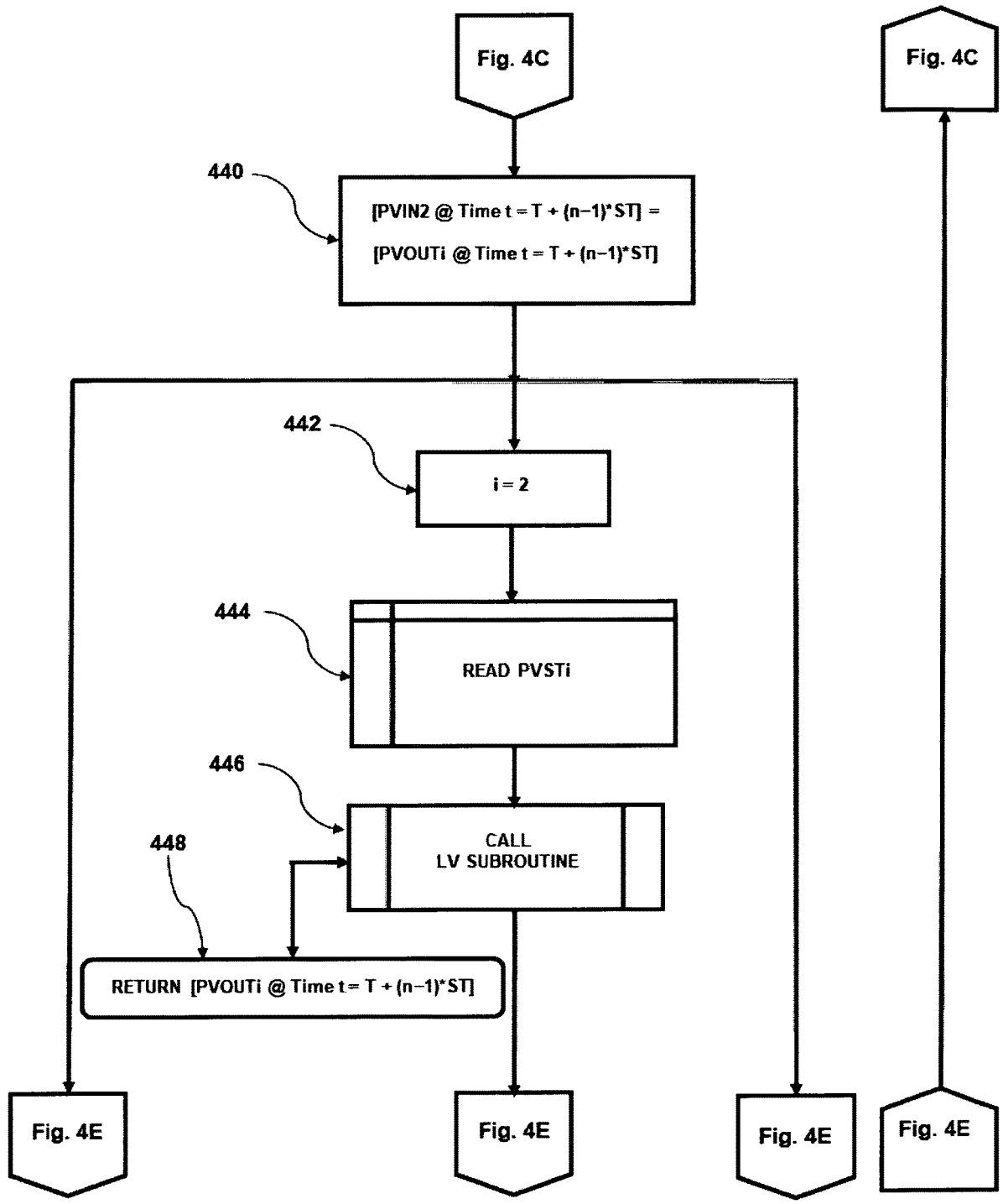

Referring to FIG. 4C, in step 428, the PV Multiplier (PVM) is acquired from row B in tables 806, 810, 814, and 818 for the appropriate controller. For computational purposes, PVM increases the magnitude of the sampled process value. For example, if [PV @ Time t=T+(n−1)*ST] is a measure of actual free residual chlorine, a typical sampled value may be 0.3 mg/l. If PVM is 1,000, the sampled value is multiplied by 1,000, resulting in a 300 mg/l used for computation by the PV Subprogram. For conductivity control PVM ranges from 1 to 100 with midpoint value of 10; for free residual chlorine it ranges from 100 to 10,000 with midpoint value 1,000; for level it ranges from 10 to 1,000 with midpoint value 100; and for pH it ranges from 100 to 5,000 with midpoint value 1,000.

In step 430, counter "i" is set to 1 and in step 432, [PVINi at Time t=T+(n−1)*ST] is calculated as the product of [PV @ Time t=T+(n−1)*ST] and PVM. For consistency, [PVINi at Time t=T+(n−1)*ST] and [SVINj at Time t=T+(n−1)*ST] are LV Subprogram input variables and [PVOUTi @ Time t=T+(n−1)*ST] and [SVOUTj @ Time t=T+(n−1)*ST] are the corresponding outputs. In step 434, 1st PV SMOOTH TIME (PVSTi where i=1) is read from row C in 806, 810, 814, and 818 for the appropriate controller. For conductivity control PVST1 ranges from 20 to 1,000 seconds with midpoint value of 180 seconds; for free residual chlorine it ranges from 120 to 1,000 with midpoint value 180 seconds; for level it ranges from 120 to 1,000 with midpoint value 180; and for pH it ranges from 120 to 1,000 with midpoint value 240. In step 436, the PV Subprogram requests the LV Subprogram with PVST1 and [PVIN1 @ Time t=T+(n−1)*ST].

Figure 6A:
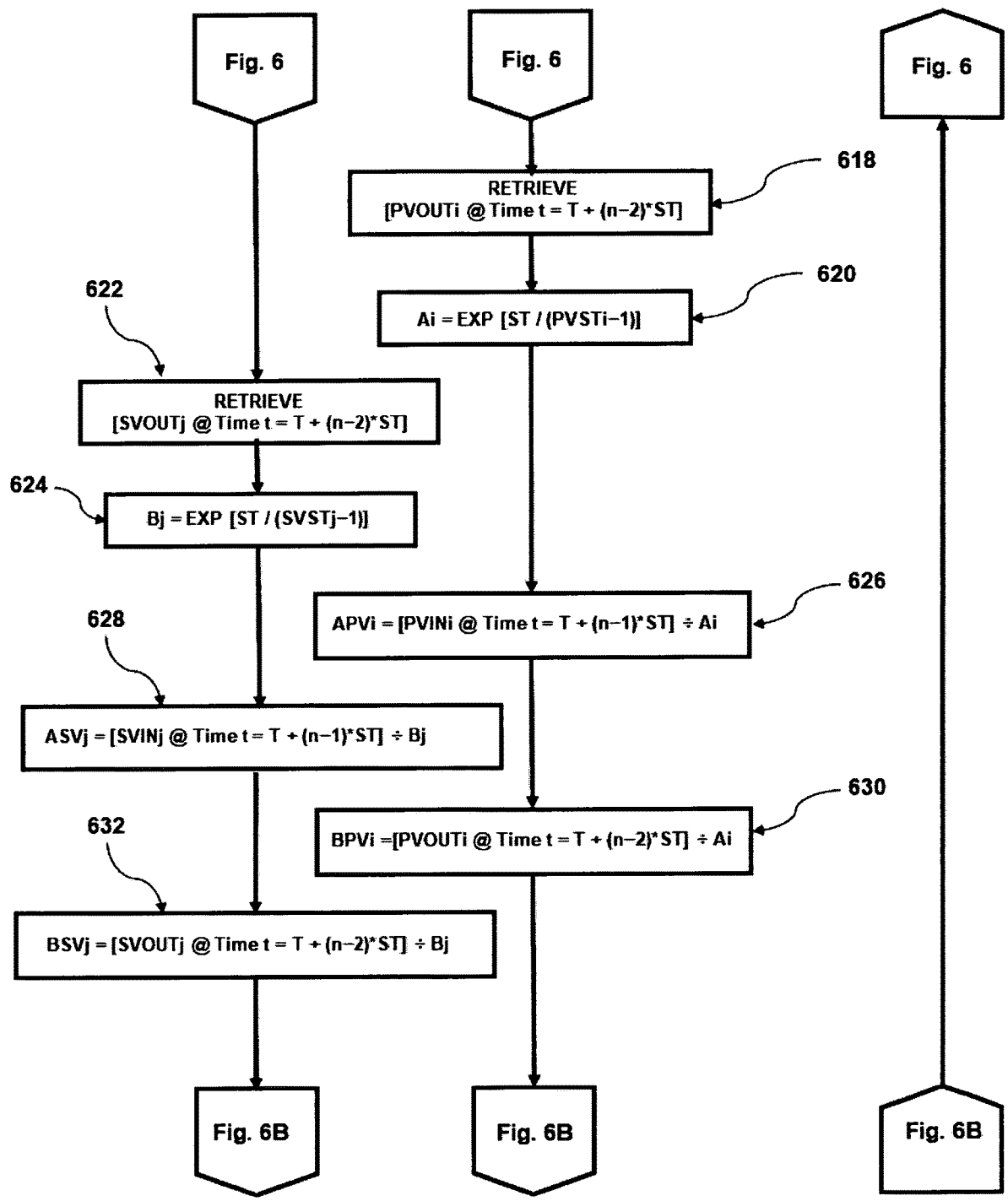
Figure 6B:
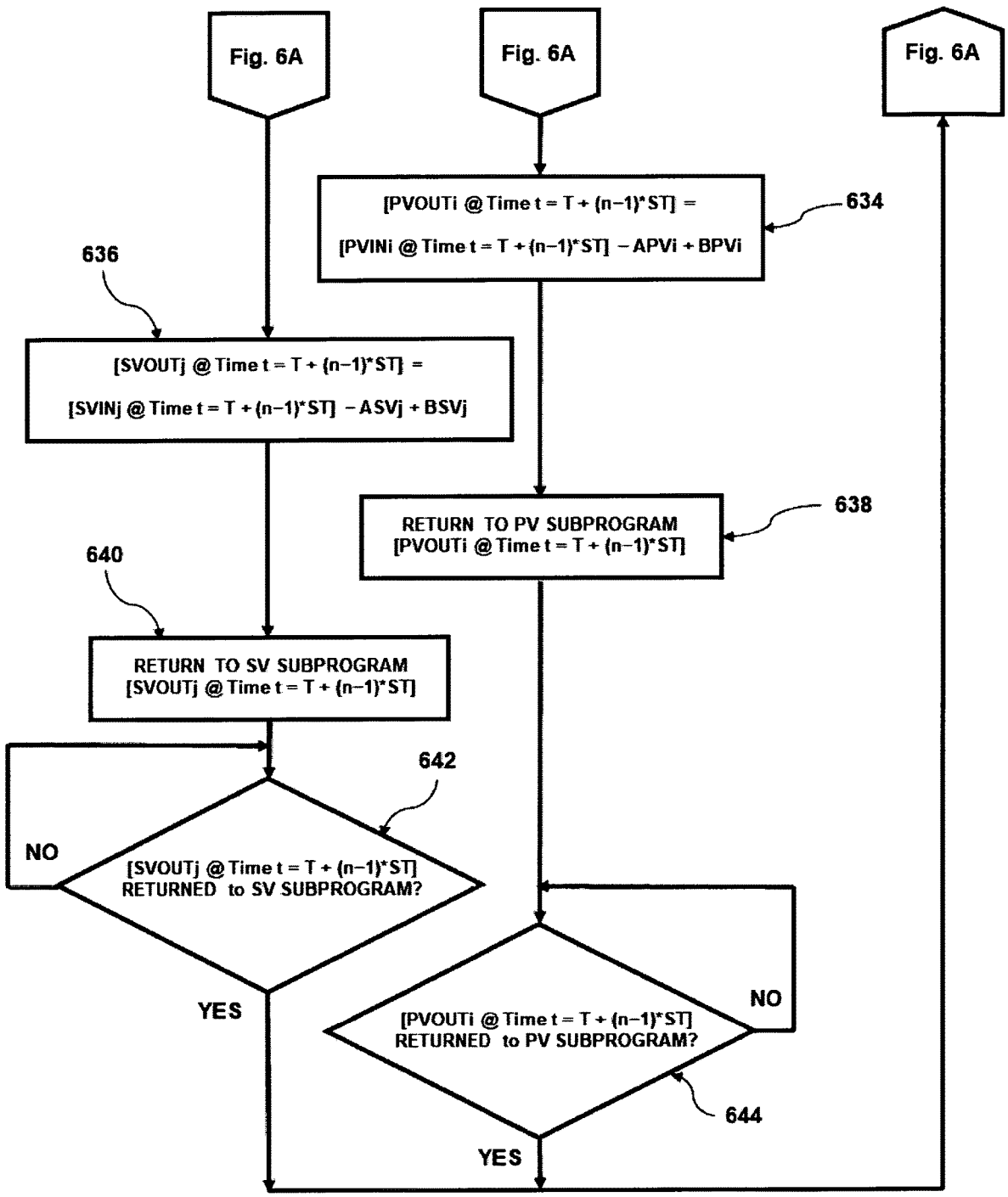

For given [PVINi at Time t=T+(n−1)*ST] and PVSTi, LV Subprogram 600 in FIGS. 6, 6A, and 6B calculates and returns to the PV Subprogram [PVOUTi @ Time t=T+(n−1)*ST] for i=1, step 438, and for i=2, step 448. The LV Subprogram is described more fully below. In step 440, [PVIN2 @ Time t=T+(n−1)*ST] is set equal to [PVOUT1 @ Time t=T+(n−1)*ST]. At step 442, counter "i" is set equal to 2. In step 444, 2nd PV SMOOTH TIME (PVSTi where i=2) is read from row D in tables 806, 810, 814, or 818 for the appropriate controller. PVST2 ranges from 3 to 10 seconds, with midpoint value of 6 seconds, for control of conductivity, free residual chlorine, level, and pH. In step 446, the PV Subprogram calls LV Subprogram with PVST2 and [PVIN2 @ Time t=T+(n−1)*ST]. In step 448, LV Subprogram calculates and returns [PVOUT2 @ Time t=T+(n−1)*ST].

Figure 4E:
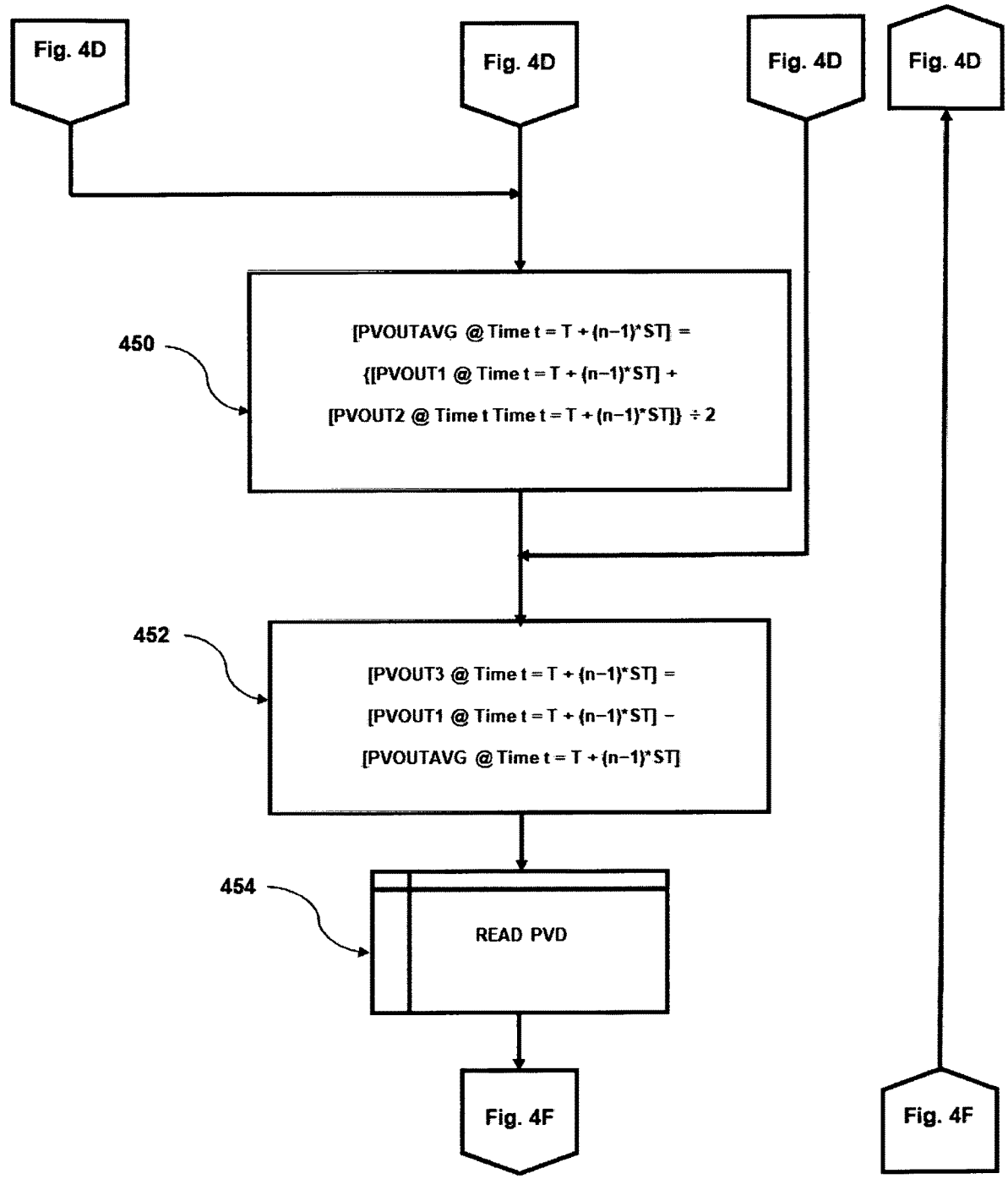

In step 450 in FIG. 4E, average [PVOUTAVG @ Time t=T+(n−1)*ST] of [PVOUT1 @ Time t=T+(n−1)*ST] and [PVOUT2 @ Time t=T+(n−1)*ST] is calculated. In step 452, [PVOUT3 @ Time t=T+(n−1)*ST] is calculated as difference between [PVOUT1 @ Time t=T+(n−1)*ST] and [PVOUTAVG @ Time t=T+(n−1)*ST]. At step 454, the PV Divisor (PVD) is read from row E in tables 806, 810, 814, or 818. PVD is always ½ the magnitude of PVST2 and with the same dimensions.

In FIG. 4F, at step 456, [PVROC @ Time t=T+(n−1)*ST] is calculated by dividing [PVOUT3 @ Time t=T+(n−1)*ST] by PVD. In step 458, [PVROC @ Time t=T+(n−1)*ST] is returned to MN Program. Once [PVROC @ Time t=T+(n−1)*ST] is returned to MN Program, step 460 directs PV Subprogram to return to 404 to await the next request for the PV Subprogram.

500 in FIGS. 5, 5A, 5B, and 5C is a flow chart of the SV Subprogram common to all controllers, 116, 118, 120, and 122. SV Subprogram returns to 300 [SVROC @ Time t=T+(n−1)*ST]. In FIG. 5, step 502 represents activation of 500. Step 504 waits for a request from MN Program. From the MN Program, T is retrieved, step 406, counter "n" is retrieved, step 408, ST is read from row A in table 806, 810,

814, or 818, step 306, [PV @ Time t=T+(n−1)*ST] is retrieved, step 410, and [SV @ Time t=T+(n−1)*ST], step 506.

Figure 5A:
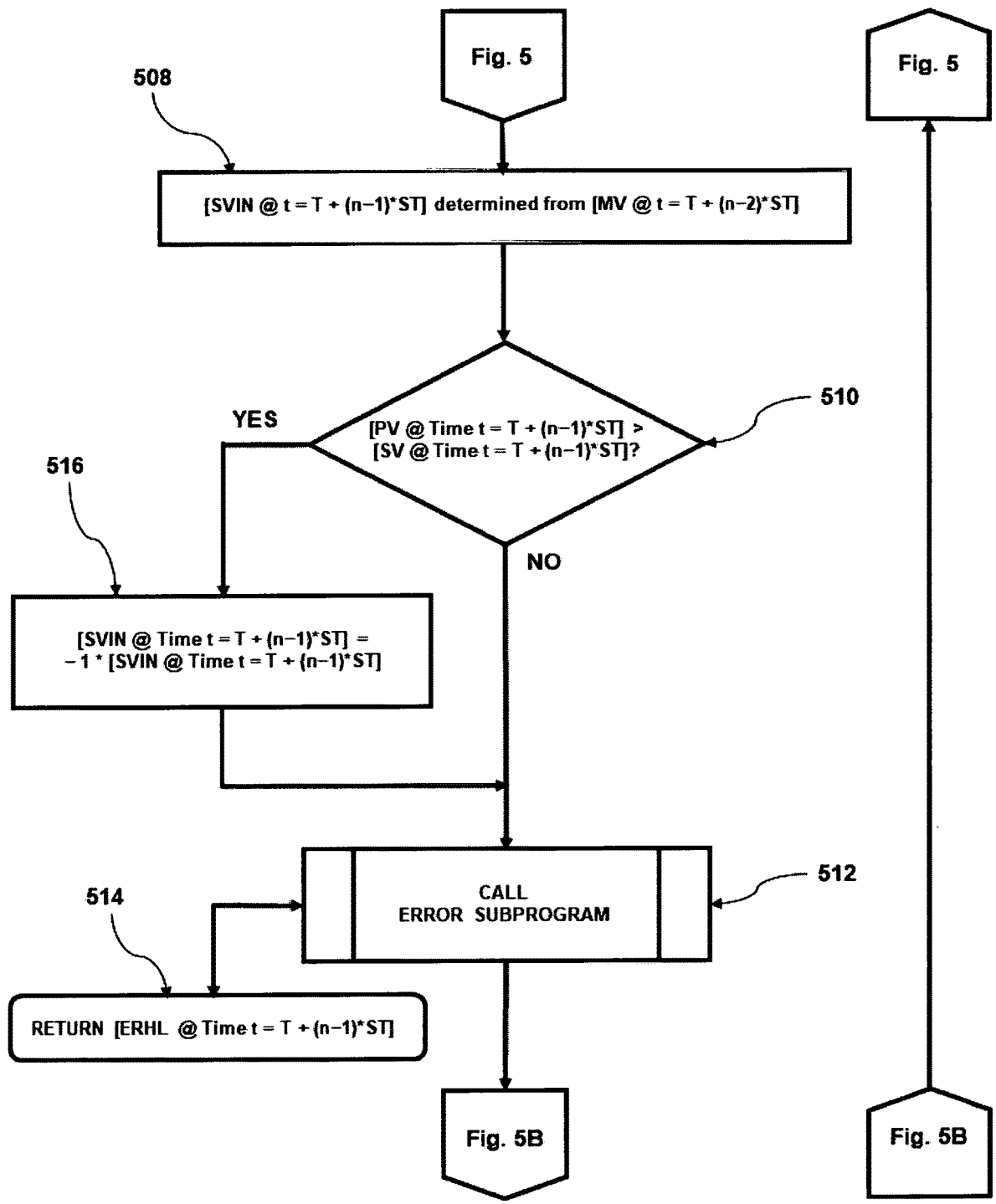
Figure 5B:
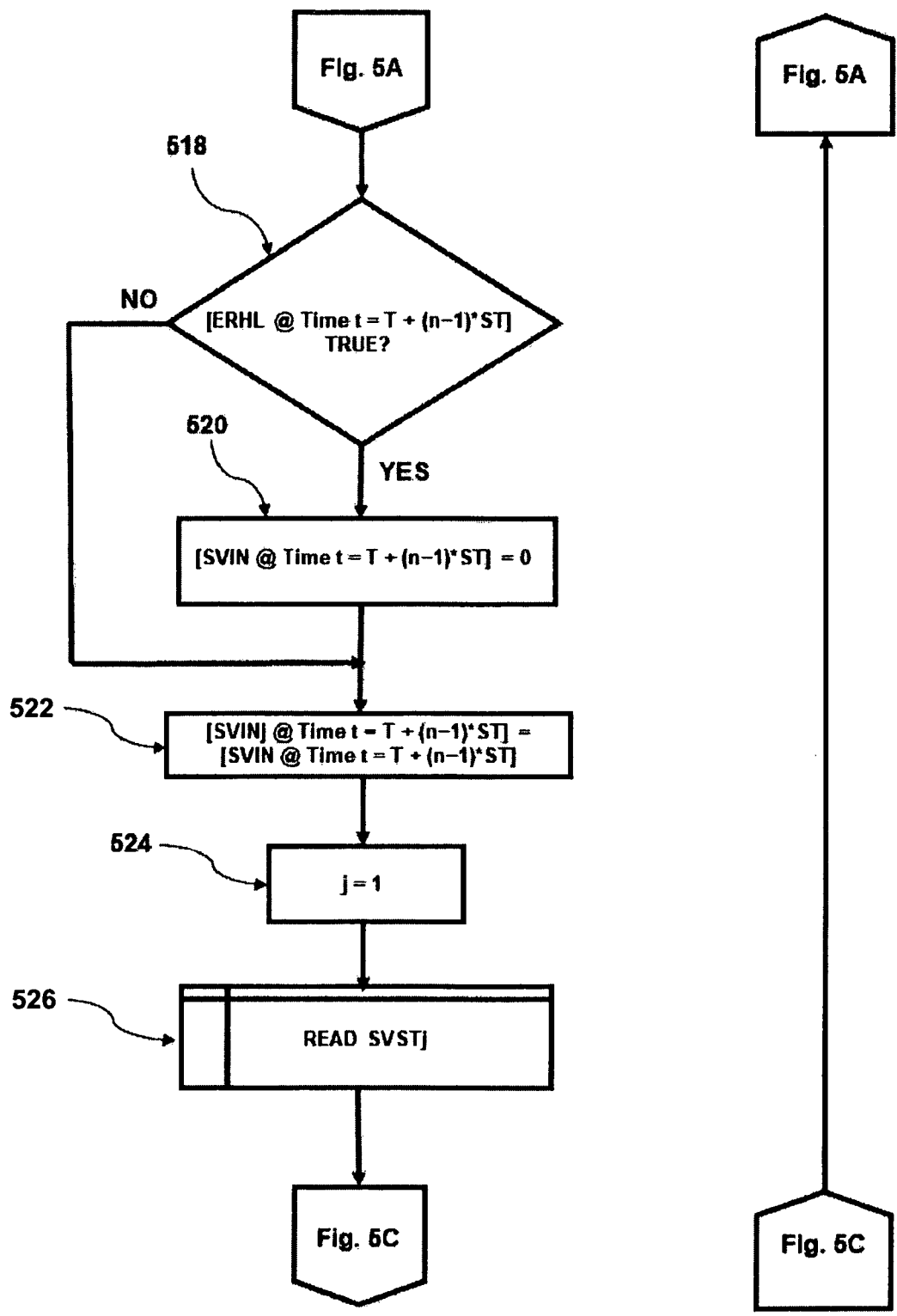
Figure 5C:
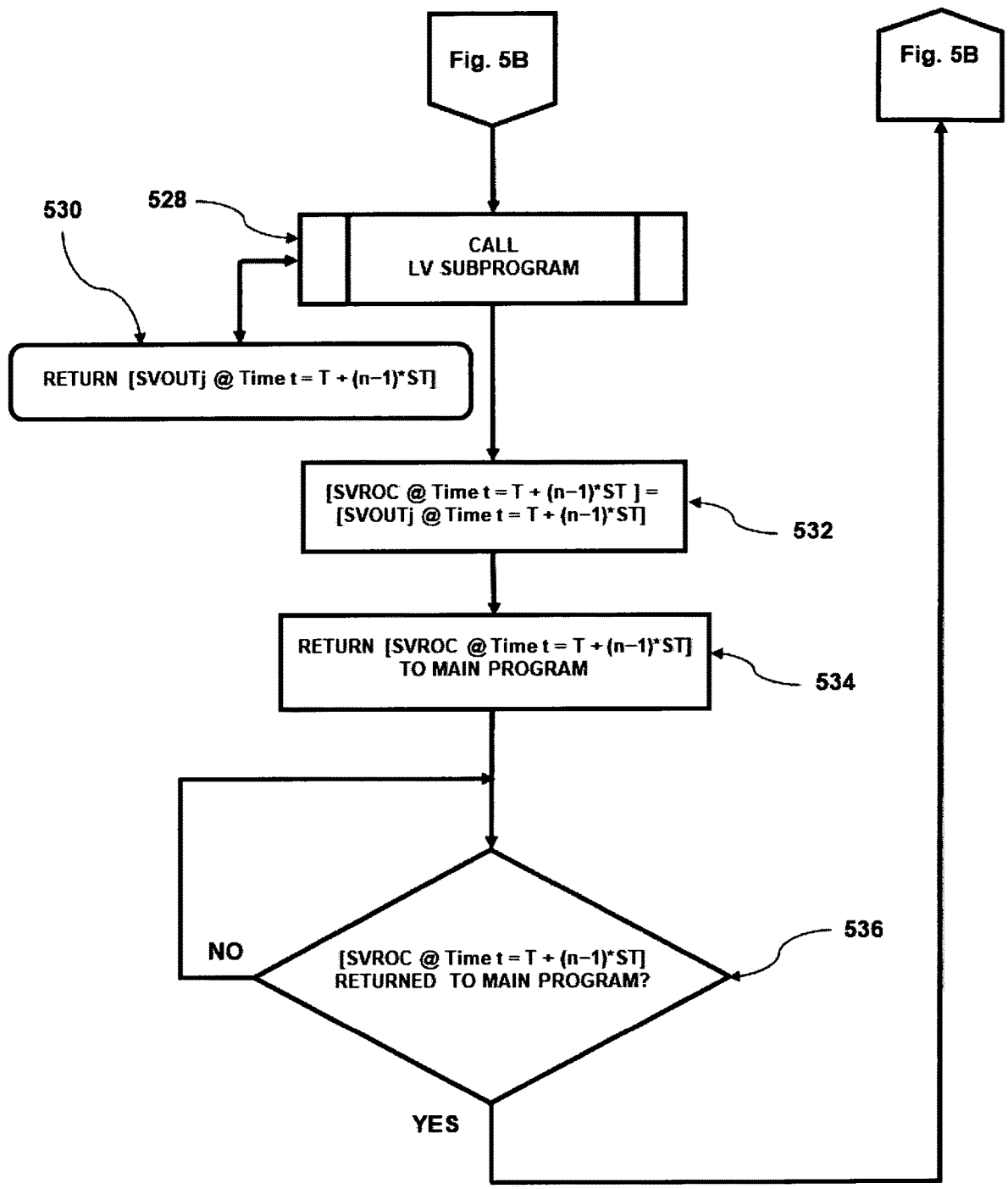

In step 508 in FIG. 5A [SVIN @ Time t=T+(n−1)*ST] is determined from [MV @ Time t=T+(n−2)*ST] for any n>1. In the preferred embodiment for conductivity control, as [MV @ Time t=T+(n−2)*ST] increases from 0 to 100%, [SVIN @ Time t=T+(n−1)*ST] decreases uniformly from 3.0 to 0.01; and for control of free residual chlorine, level, and pH, it decreases uniformly from 1.0 to 0.01.

In step 510 magnitude of [PV @ Time t=T+(n−1)*ST] is compared to [SV @ Time t=T+(n−1)*ST]. If [PV @ Time t=T+(n−1)*ST] is greater than [SV @ Time t=T+(n−1)*ST], [SVIN @ Time t=T+(n−1)*ST] must be less than zero. If true, in step 516 additive inverse of [SVIN @ Time t=T+(n−1)*ST] is calculated by multiplying [SVIN @ Time t=T+(n−1)*ST] by −1. If [PV @ Time t=T+(n−1)*ST] is not greater than [SV @ Time t=T+(n−1)*ST], step 516 is by-passed and [SVIN @ Time t=T+(n−1)*ST] is positive.

In step 512 the SV Subprogram calls the ER Subprogram 700. In step 514, ER Subprogram 700 returns to SV Program [ERHL @ Time t=T+(n−1)*ST] true or false. Step 518 in FIG. 5B checks if [ERHL @ Time t=T+(n−1)*ST] is true or false. If [ERHL @ Time t=T+(n−1)*ST] is true, the process value is within the user's preselected limits of the set value and [SVIN @ Time t=T+(n−1)*ST] is set to 0, step 520. If [ERHL @ Time t=T+(n−1)*ST] is false, step 520 is bypassed. If true or false, in step 522 [SVINj @ Time t=T+(n−1)*ST] is set equal to [SVIN @ Time t=T+(n−1)*ST]. In step 524 counter "j" is set to 1.1$^{st}$ SV SMOOTH TIME (SVSTj with j=1) is read from row F in table 806, 810, 814, or 818, step 526. SVST1 ranges from 2 to 10 seconds with midpoint value of 4 seconds for control of conductivity, free residual chlorine, level, and pH. In step 528 in FIG. 5C, SV Subprogram calls LV Subprogram with [SVINj @ Time t=T+(n−1)*ST] and SVSTj at j=1. At step 530, LV Subprogram returns [SVOUTj @ Time t=T+(n−1)*ST] to SV Subprogram. In step 532, [SVROC @ Time t=T+(n−1)*ST] is set equal [SVOUTj @ Time t=T+(n−1)*ST]. At step 534, [SVROC @ Time t=T+(n−1)*ST] is returned to 300. In step 536 in FIG. 5C, once returned, SV Subprogram returns to step 504 waiting for the next call from MN Program.

600 in FIGS. 6, 6A, and 6B is a flow chart of the LV Subprogram. LV Subprogram mathematically gives weight to the most recent sample and less weight to the preceding sample reducing the variation between variables calculated or sampled at Time t=T+(n−1)*ST and Time t=T+(n−2)*ST for all n>1. The relative weight given to the most recent value is determined by the smoothing time; i.e., 1st PV Smooth Time (PVST1) from row C in tables 806, 810, 814, or 818, 2nd PV Smooth Time (PVST2) from row D, and 1st SV Smooth Time (SVST1) from row F. The equations are shown as Eq. 1 to calculate [PVOUTi @ Time t=T+(n−1)*ST] and Eq. 2 for [SVOUTj @ Time t=T+(n−1)*ST]:

$$[PVOUTi@Timet=T+(n-1)*ST]=[PVINi@Timet=T+(n-1)*ST]-\{[PVINi@Timet=T+(n-1)*ST]\div Ai\}+\{[PVOUTi@Timet=T+(n-2)*ST]\div Ai\},\quad \text{Eq. 1}$$

for all n>1; where Ai=EXP (ST/(PVSTi−1)); i=1 or 2; EXP (ST/(PVSTi−1))=$e^{(ST/(PVSTi-1))}$; and PVSTi>1.

$$[SVOUTj@Time\ t=T+(n-1)*ST]=[SVINj@Time\ t=T+(n-1)*ST]-\{[SVINj@Time\ t=T+(n-1)*ST]\div Bj\}+\{[SVOUTj@Time\ t=T+(n-2)*ST]\div Bj\},\quad \text{Eq. 2}$$

for all n>1; where Bj=EXP (ST/(SVSTj−1)); EXP (ST/(SVSTj−1))=$e^{(ST/(SVSTj-1))}$; and SVSTj>1.

Referring to FIG. 6, step 602 represents energizing the LV Subprogram. In step 604, the LV Subprogram waits for a request from the PV Subprogram or SV Subprogram. At step 306, as previously shown in FIG. 3, ST is read from table 806, 810, 814, or 818. In step 408, LV Subprogram retrieves counter "n". In steps 606 and 608, LV Subprogram determines which of the PV Subprogram or SV Subprogram the request is originating.

If the request to the LV Subprogram is from the PV Subprogram and to return [PVOUTi @ Time t=T+(n−1)*ST], see steps 436 and 438, in step 610 the value of i=1 is retrieved from step 430 in the PV Subprogram. Here, PVST1 is read from table 806, 810, 814, or 818, step 612. In step 618 in FIG. 6A, LV Subprogram retrieves [PVOUTi @ Time t=T+(n−2)*ST] with i=1 from PV Subprogram. In step 620, dimensionless smoothing number, "Ai" is calculated from $e^{(ST/(PVSTi-1))}$. In step 626, APVi is determined as the quotient of [PVINi @ Time t=T+(n−1)*ST] as dividend and Ai as divisor. In step 630, BPVi is determined as the quotient of [PVOUTi @ Time t=T+(n−2)*ST] as dividend and Ai as divisor. In step 634 in FIG. 6B, [PVOUTi @ Time t=T+(n−1)*ST] is calculated as [PVINi @ Time t=T+(n−1)*ST] minus APVi plus BPVi. In step 638, [PVOUTi @ Time t=T+(n−1)*ST] is returned to the PV Subprogram at step 438 in FIG. 4C. LV Subprogram waits at step 644 to confirm [PVOUTi @ Time t=T+(n−1)*ST] has been returned. If so, LV Subprogram returns to step 604.

If the request to the LV Subprogram is from the PV Subprogram and to return [PVOUTi @ Time t=T+(n−1)*ST], see steps 446 and 448, in step 610 the value of i=2 is retrieved from step 442 in the PV Subprogram. Here, PVST2 is read from table 806, 810, 814, or 818, step 612. In step 618 in FIG. 6A, LV Subprogram retrieves [PVOUTi @ Time t=T+(n−2)*ST] from PV Subprogram with i=2. Steps 620, 626, 630, 634, 638, and 644 are repeated as previously disclosed but with i=2.

If the request is to the LV Subprogram from the SV Subprogram to return [SVOUTj @ Time t=T+(n−1)*ST], see steps 528 and 530, in step 614 the value of j=1 is retrieved from step 524 in the SV Subprogram. At step 616, SVST1 is read from table 806, 810, 814, or 818. In step 622 in FIG. 6A, LV Subprogram retrieves [SVOUTj @ Time t=T+(n−2)*ST] with j=1 from SV Subprogram. In step 624, dimensionless smoothing number, "Bj" is calculated from $e^{(ST/(SVSTj-1))}$. In step 628, ASVj is determined as the quotient of [SVINj @ Time t=T+(n−1)*ST] as dividend and Bj as divisor. In step 632, BSVj is determined as the quotient of [SVOUTj @ Time t=T+(n−2)*ST] as dividend and Bj as divisor. In step 636 in FIG. 6B, [SVOUTj @ Time t=T+(n−1)*ST] is calculated as [SVINj@ Time t=T+(n−1)*ST] minus ASVj plus BSVj. In step 640, [SVOUTj @ Time t=T+(n−1)*ST] is returned to the SV Subprogram at step 530 in FIG. 5C. LV Subprogram waits at step 642 to confirm [SVOUTj @ Time t=T+(n−1)*ST] has been returned. If so, LV Subprogram returns to step 604.

Figure 7:
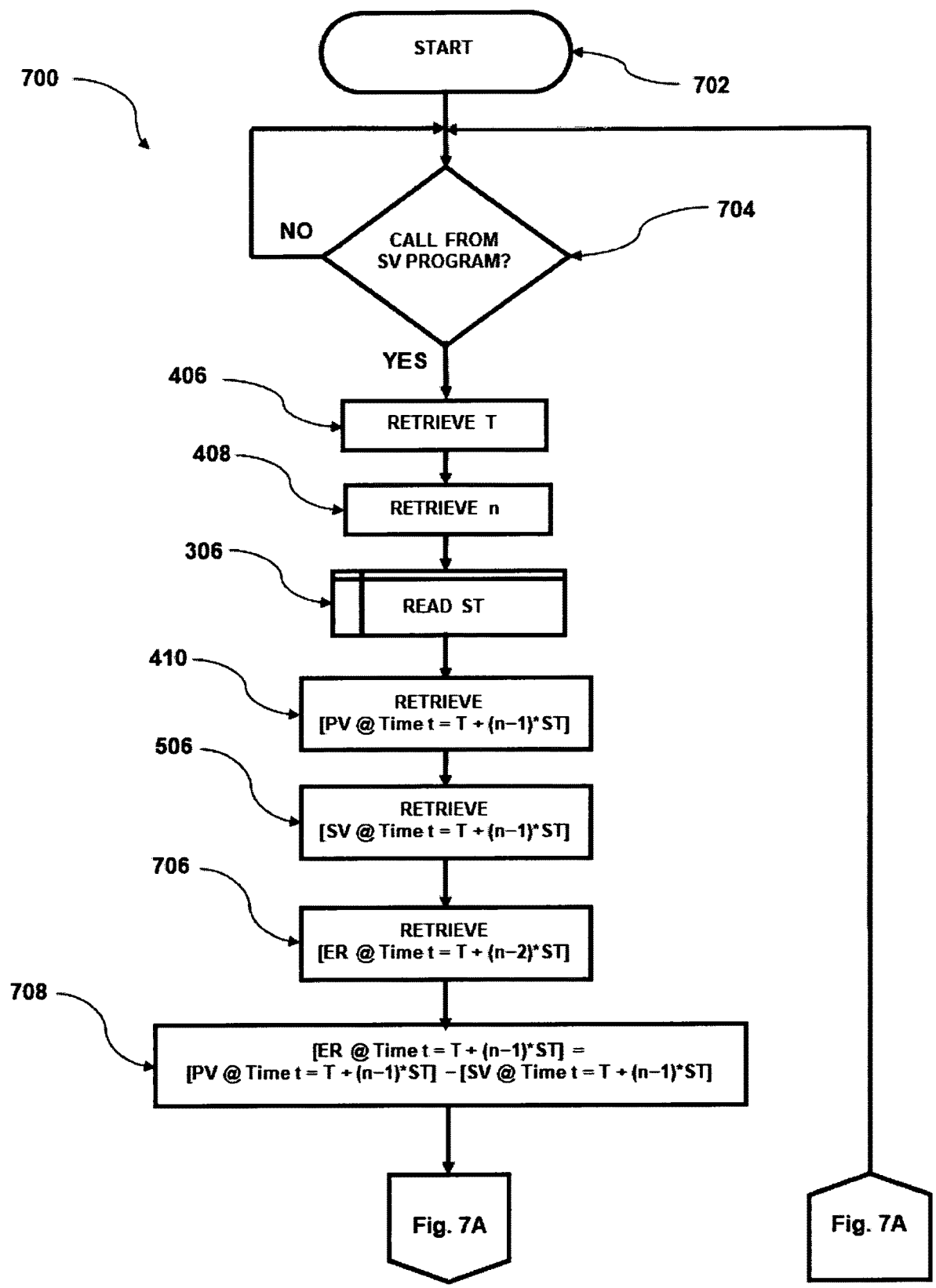
FIGS. 7, 7A, and 7B are flow charts depicting the error subprogram (ER Subprogram) that calculates and returns to the SV Subprogram the high-low error states.
Figure 7A:
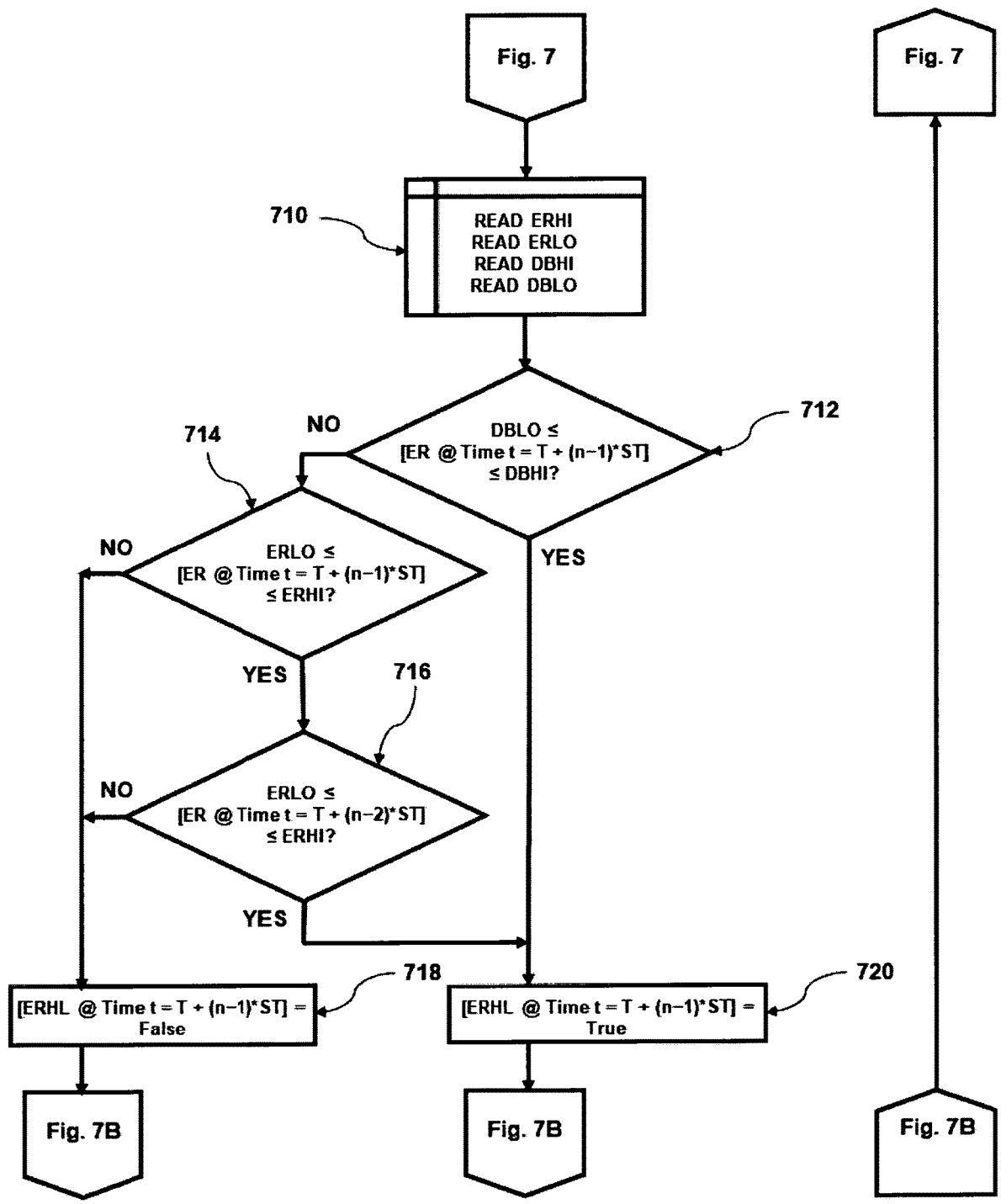
Figure 7B:
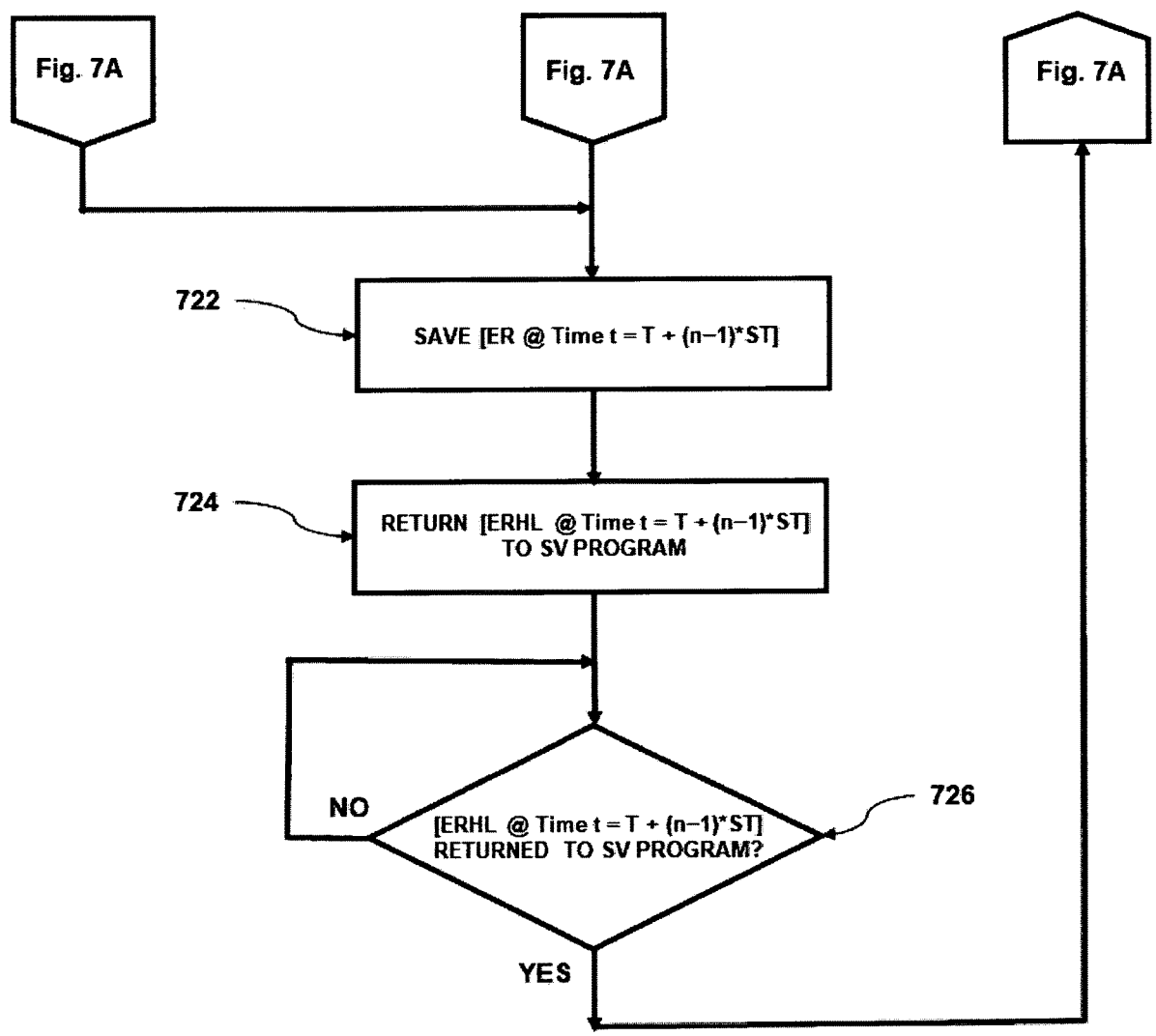
Figure 8D:
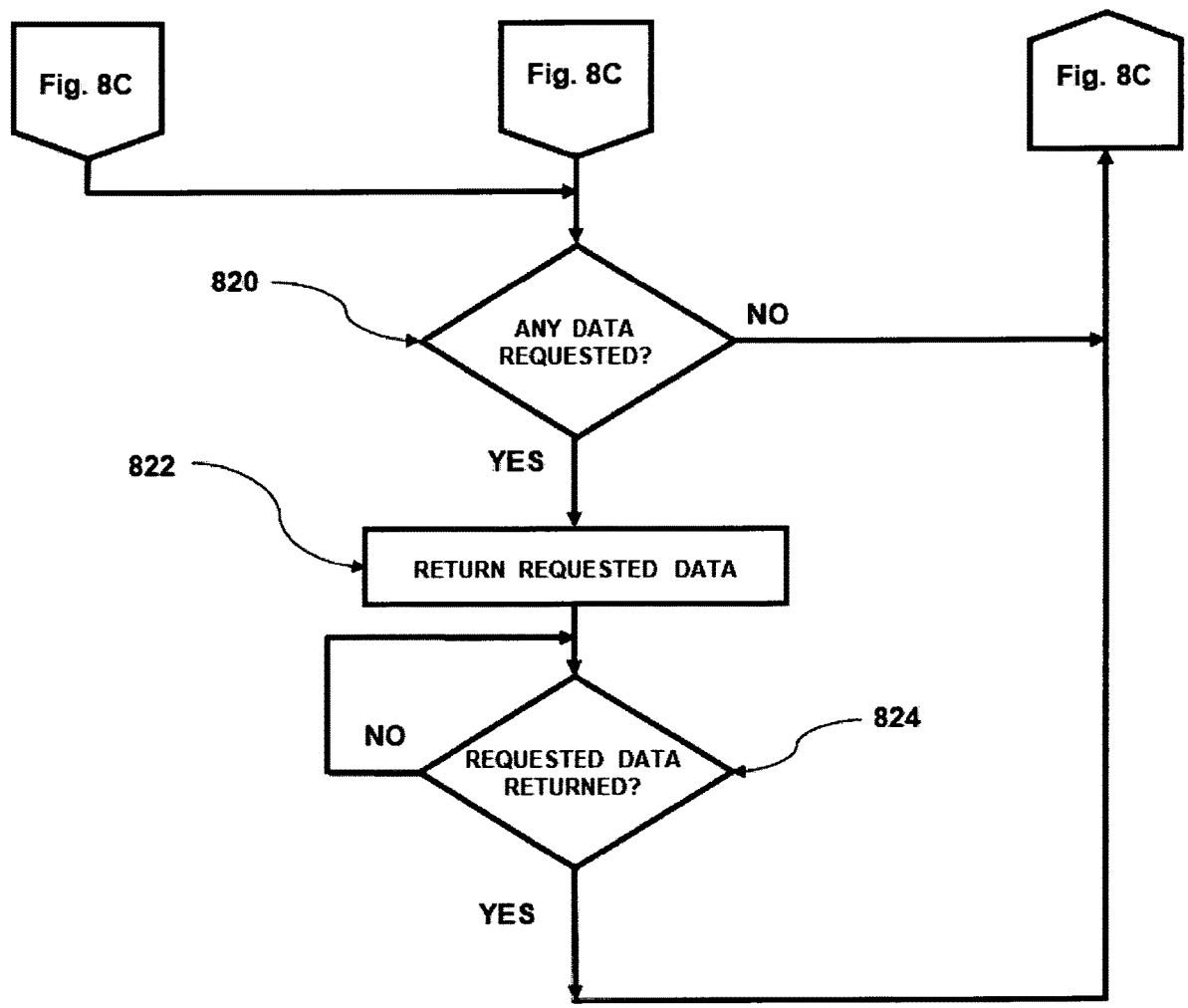

700 in FIGS. 7, 7A, and 7B is a flow chart of the ER Subprogram. ER Subprogram compares the actual error, [ER @ Time t=T+(n−1)*ST]; i.e., —difference between [PV @ Time t=T+(n−1)*ST] and [SV @ Time t=T+(n−1)*ST]— to high and low error and dead band limits entered by the user. Depending on the state—true or false—of [ERHL @ Time t=T+(n−1)*ST], the value of [SVIN @ Time t=T+(n−1)*ST] is unchanged from its current value or set equal to 0.

In FIG. 7, step 702 represents activation of 700. Step 704 waits for a request from SV Program. On a request, step 406 retrieves T, step 408 retrieves n, step 306 reads ST from table 806, 810, 814, or 818, step 410 retrieves [PV @ Time t=T+(n−1)*ST], and step 506 retrieves [SV @ Time t=T+(n−1)*ST]. In step 706, [ER @ Time t=T+(n−2)*ST] is retrieved from memory. In step 708, [ER @ Time t=T+(n−1)*ST] is calculated as [PV @ Time t=T+(n−1)*ST] minus [SV @ Time t=T+(n−1)*ST]. In FIG. 7A, step 710, from table 806, 810, 814, or 818, Error Limit High (ERHI) is read at row J, Error Limit Low (ERLO) at row K, Deadband Limit High (DBHI) at row L, and Deadband Limit Low (DBLO) at row M.

For conductivity, in table 806, row J, ERHI ranges from low value of +10 to high value of +30, with midpoint value of +20 µS/cm; row K, ERLO ranges from low value of −10 to high value of −30, with midpoint value of −20 µS/cm; row L, DBHI ranges from low value of +5 to high value of +25, with midpoint value of +15 µS/cm; and row M, DBLO ranges from low value of −5 to high value of −25, with midpoint value of −15 µS/cm. For free residual chlorine, in table 810, row J, ERHI ranges from low value of +0.025 to high value of +0.075, with midpoint value of +0.05 mg/l; row K, ERLO ranges from low value of −0.025 to high value of −0.075, with midpoint value of −0.05 mg/l; row L, DBHI ranges from low value of +0.020 to high value of +0.070, with midpoint value of +0.045 mg/l; and row M, DBLO ranges from low value of −0.020 to high value of −0.070, with midpoint value of −0.045 mg/l. For level, in table 814, row J, ERHI ranges from low value of +0.10 to high value of +0.40, with midpoint value of +0.25 inches; row K, ERLO ranges from low value of −0.10 to high value of −0.40, with midpoint value of −0.25 inches; row L, DBHI ranges from low value of +0.075 to high value of +0.375, with midpoint value of +0.225 inches; and row M, DBLO ranges from low value of −0.075 to high value of −0.375, with midpoint value of −0.225 inches. For pH, in table 818, row J, ERHI ranges from low value of +0.015 to high value of +0.040, with midpoint value of +0.025 inches; row K, ERLO ranges from low value of −0.015 to high value of −0.040, with midpoint value of −0.025; row L, DBHI ranges from low value of +0.0125 to high value of +0.0375, with midpoint value of +0.0225; and row M, DBLO ranges from low value of −0.0125 to high value of −0.0375, with midpoint value of −0.0225.

The state, true or false, of [ERHL @ Time t=T+(n−1)*ST] is determined in steps 712, 714, and 716. In step 712, [ER @ Time t=T+(n−1)*ST] is checked if greater than or equal to DBLO and less than or equal to DBHI. If yes, step 720, [ERHL @ Time t=T+(n−1)*ST] is set to true. If no, step 714, [ER @ Time t=T+(n−1)*ST] is checked if greater than or equal to ERLO and less than or equal to ERHI. If no, in step 718, the state of [ERHL @ Time t=T+(n−1)*ST] is set false. If yes, step 716, [ER @ Time t=T+(n−2)*ST] is checked if greater than or equal to ERLO and less than or equal to ERHI. If no, in step 718, the state of [ERHL @ Time t=T+(n−1)*ST] is set false. If yes, step 720, state of [ERHL @ Time t=T+(n−1)*ST] is set to true. Referring to FIG. 7B, in step 722, [ER @ Time t=T+(n−1)*ST] is saved to memory. In step 724, state of [ERHL @ Time t=T+(n−1)*ST] is returned to SV Program at step 514. Once confirmed in step 726, ER Subprogram returns to step 704.

800 in FIGS. 8, 8A, 8B, 8C, and 8D is a flow chart containing data required to implement the control strategy disclosed here. In FIG. 8, step 802 represents activation of 800. Step 804 checks for a request for data for conductivity control. If yes, data is read from table 806. After reading data from table 806 or if request is not for data for conductivity control, at step 808, check is made if data is for free residual chlorine control. If yes, data is read from table 810. After reading data from table 810 or if request is not for data for free residual chlorine control, at step 812, check is made if data is for level control. If yes, data is read from table 814. After reading data from table 814 or if request is not for data for level control, at step 816, check is made if data is for pH control. If yes, data is read from table 818. After reading data from table 818 or if request is not for data for pH control, at step 820, if no data has been requested the program returns to step 804. If data has been requested, in step 822, the requested data is returned to the requesting program or subprogram. In step 824, the data program waits until the request is fulfilled. Once fulfilled, it returns to step 804.

3. Detailed Description of the Method of Using the Preferred Embodiment of the System Referring to FIG. 1, given is a forced- or induced-draft cooling tower assembly 100, comprising louvered casing 162, fan 158, basin 102 having a volumetric capacity of 750,000 gallons or more, basin design depth nominally 24 inches to 60 inches, at least one (1) circulation pump 104, at least one (1) heat transfer device 160, and basin containing water of level 106, nominally one-half (½) to two-thirds (⅔) of design depth. With given 100, the user installs a level probe 108, free residual chlorine probe 110, pH probe 112, and conductivity probe 114, all communicating with the water in the basin.

The user creates a digital sampled-data control system based on programmable PID controllers, 116, 118, 120, and 122, each with an embedded PID controller and with sufficient memory to store user-entered data and programs, at least one (1) input and one (1) output, user interface for programming, data entry, selecting automatic or manual control mode, and to initiate rate-of-change transition and rate-of-change control, and digital displays of set values, process values, and manipulated values. The user electronically connects 108 to level controller 122, 110 to free residual chlorine controller 120, 112 to pH controller 118, and 114 to conductivity controller 116. The four (4) controllers may be housed in one enclosure, or each in their own enclosure.

Referring to FIG. 1, the four (4) inputs comprise: 108 communicating level process value PVL, item 134, to 122; 110 communicating free residual chlorine process value PVF, item 136, to 120; 112 communicating pH process value PVP, item 138, to 118; and 114 communicating conductivity process value PVC, item 140 to 116. The four (4) outputs comprise: 122 communicating manipulated value MVL, item 148, to level control valve 156; 120 communicating manipulated value MVF, item 146, to hypochlorite dosing pump 154; 118 communicating manipulated value MVP, item 150, to acid dosing pump 152; and 116 communicating manipulated value MVC, item 142, to conductivity control valve 124.

For conductivity measurement, user confirms measuring probe is capable of detecting the conductivity of cooling water ranging from 0 to 10,000 µS/cm with Pt100RTD integrated temperature sensor, connected to a conductivity transmitter with resolution of 10 µS/cm, accuracy no less than 1% of full scale, operating temperature of 32° F. to 212° F., and 4 to 20 mA output. For free residual chlorine measurement, user confirms the probe has a measuring range of 0 to 5 ppm free chlorine at pH of 5.5 to 8.5, operating temperature of 32° F. to 120° F., and 4 to 20 mA output. For level measurement, user confirms indicating probe comprises a reflective ultrasonic liquid level transmitter, nominal 60-inch measurement range, accuracy of +/−0.2% of full range, operating temperature of 32° F. to 176° F., and 4 to 20 mA output. For pH measurement, user confirms measuring probe comprises a differential pH probe with measurement range of 0 to 14, stability of 0.03 pH units per 24 hours, non-cumulative, temperature measured by internal 10K NTC thermistor with compensation, operating temperature of 32° F. to 185° F., and direct 4 to 20 mA output.

User enters set values for controllers, 116, 118, 120, and 122. Depending on makeup conductivity and COC, conductivity set point SPC, 126, nominally ranges from 2,000 to 5,000 µS/cm. pH set point SPP, 128, nominally ranges from 6 to 9 pH units. Free residual chlorine set point SPF, 130, nominally ranges from 0.3 to 0.5 mg/l. Level set point SPL, 132, nominally ranges from 12 to 48 inches depending on the working depth of basin 102.

The user enters into the memory of each programmable controller the relationship relating [SVIN @ Time t=T+(n−1)*ST] to [MV @ Time t=T+(n−2)*ST] for conductivity, free residual chlorine, level, and pH.

User skilled in the art of computer programming converts the steps in flow charts 300, 400, 500, 600, 700, and 800 into source code, usable, storable, accessible, and executable by 116, 118, 120, and 122. The programs permit the programmable PID controller to output manipulated values based on process value and set value inputs or rate-of-change process value and rate-of-change set value inputs.

Cooling tower basin 102 is filled with water to level 106 and hypochlorite-containing solution is staged at pump 154 and acid at pump 152. Each controller is energized activating the source codes represented by flow charts 300, 400, 500, 600, 700, and 800. Referring to FIG. 3, T, arbitrary start time, is set. All other data are read from tables 806, 810, 814, or 818. Pump 104 and cooling tower fan 158 are energized. The provisioning of 116, 118, 120, and 122 controls the cooling water conductivity, pH, free residual chlorine, and level as disclosed.

User turns rate-of-change transition selector to OFF and rate-of-change control selector to OFF. Control of conductivity, pH, free residual chlorine, and level is initiated in automatic mode based on process value and set value inputs. After control of conductivity, pH, free residual chlorine, and level achieves acceptable stability in automatic mode, user turns rate-of-change transition selector to ON and adjusts controller to manual mode. User monitors difference between rate-of-change process value and rate-of-change set value. Once difference is within preselected limits, user turns rate-of-change control selector to ON and adjusts controller to automatic mode. Control of conductivity, pH, free residual chlorine, and level is now based on inputs of rate-of-change process value and rate-of-change set value.

Operation of cooling tower 100 continues until de-energized and control continues as disclosed until controllers 116, 118, 120, and 122 are de-energized.

Persons of skill in the art of selecting, connecting, and in the loading and operating the software for electronic process controllers understand that the system and method of using the system described in the preferred embodiment can vary and still remain within the invention herein described. Variations obvious to those persons skilled in the art are included in the invention.

This written description uses examples to disclose the invention, including the preferred embodiment, and also to enable a person of ordinary skill in the relevant art to practice the invention, including making and using any devices or systems and performing any incorporated methods. The patentable scope of the invention is defined by the claims, and may include other examples that occur to those person of ordinary skill in the art. Such other examples are intended to be within the scope of the claims if they have structural elements that do not differ from the literal language of the claims, or if they include equivalent structural elements with insubstantial differences from the literal language of the claims.

Further, multiple variations and modifications are possible in the embodiments of the invention described here. Although a certain illustrative embodiment of the invention has been shown and described here, a wide range of modifications, changes, and substitutions is contemplated in the foregoing disclosure. In some instances, some features of the present invention may be employed without a corresponding use of the other features; such as more or less of the cooling tower control disclosed here. Accordingly, it is appropriate that the foregoing description be construed broadly and understood as being given by way of illustration and example only, the spirit and scope of the invention being limited only by the appended claims.

I claim:

1. A system which, for a large open recirculating cooling tower, improves control of concentration of free residual chlorine, conductivity, and pH in cooling water, and level in a cooling tower basin, comprising;
   a. a programmable controller that is user-programmable and provisioned for proportional, integral, and derivative control;
   b. a user interface for programming said programmable controller;
   c. a chlorine probe for measuring said concentration of free residual chlorine, a conductivity probe for measuring said conductivity, a level probe for measuring said level, and a pH probe for measuring said pH all electronically connected as inputs to the programmable controller;
   d. a hypochlorite dosing pump, a conductivity control valve, a level control valve, and an acid dosing pump electronically connected as outputs from the programmable controller;
   e. electronic data storage electronically connected to the programmable controller;
   f. software resident in the programmable controller;
   g. said software programmed with,
      (1) a main program;
      (2) a process value subprogram that communicates with said main program;
      (3) a set value subprogram that communicates with the main program;
      (4) a data smoothing subprogram that communicates with said process value subprogram and said set value program;
      (5) an error subprogram that communicates with the set value subprogram; and
      (6) a data table that communicates with the main program, the process value subprogram, the set value subprogram, said data smoothing subprogram, and, said error subprogram;
   whereby the programmable controller outputs a chlorine manipulated value to said hypochlorite dosing pump to admit an aqueous hypochlorite-containing solution to achieve a difference between a chlorine process value and a chlorine set value of no more than +/−0.1 mg/l, and outputs a conductivity manipulated value to said conductivity control valve to achieve a difference between a conductivity process value and a conductivity set value of no more than +/−µS/cm, and outputs a level manipulated value to said level control valve to achieve a difference between a level process value and a level set value of no more than +/−0.5 inches, and outputs a pH manipulated value to said acid dosing pump to admit an aqueous acid-containing solution to achieve a difference between a pH process value and a pH set value of no more than +/−0.05 pH units.

2. The system in claim 1 wherein said user interface,
   a. permits a user to enter a program in said programmable controller; and
   b, display,
      (1) said chlorine process value, said chlorine set value, said chlorine manipulated value;
      (2) said conductivity process value, said conductivity set value, said conductivity manipulated value;
      (3) said level process value, said level set value, said level manipulated value;
      (4) said pH process value, said pH set value, and said pH manipulated value.

3. The system in claim 1 wherein said programmable controller comprises;
   a. a chlorine controller which is user-programmable and provisioned for proportional, integral, and derivative control to control said concentration of, free residual chlorine in said cooling water;
   b. a conductivity controller which is user-programmable and provisioned for proportional, integral, and derivative control to control said conductivity in the cooling water;
   c. a level controller which is user-programmable and provisioned for proportional, integral, and derivative control to control said level in said cooling tower basin; and
   d. controller which is user-programmable and provisioned for proportional, integral, and derivative control to control said pH in the cooling water.

4. The system in claim 1 wherein;
   a. said chlorine probe has a nominal measurement range of 0 to 5 ppm;
   b. said conductivity probe has a nominal measurement range of 0 to 10,000 μS/cm;
   c. said level probe has a nominal measurement range of 0 to 60 inches; and
   d, said pH probe has a nominal measurement range of 0 to 14 pH units.

5. The system in claim 1 wherein;
   a. said hypochlorite dosing pump is a variable stroke pump to admit said aqueous hypochlorite-containing solution to said large open recirculating cooling tower;
   b. said conductivity control valve is a control valve to release water from the large open recirculating cooling tower;
   c. said level control valve is a control valve to admit fresh water to the large open recirculating cooling tower; and
   d. said acid dosing pump is a variable stroke pump to admit said aqueous acid-containing solution to the large open recirculating cooling tower.

6. The system in claim 1 wherein said electronic data storage comprises sufficient storage for;
   a. said chlorine process value, said chlorine set value, said chlorine manipulated value, a rate-of-change chlorine process value, and a rate-of-change chlorine set value;
   b. said conductivity process value, said conductivity set value, said conductivity manipulated value, a rate-of-change conductivity process value, and a rate-of-change conductivity set value;
   c. said level process value, said level set value, said level manipulated value, a rate-of-change level process value, and a rate-of-change level set value;
   d. said pH process value, said pH set value, said pH manipulated value, a rate-of-change pH process value, and a rate-of-change pH set value; and
   e. data entered into said data table.

7. The system in claim 1 wherein said main program comprises an algorithm that,
   a. stores a proportional gain, an integral time, and a derivative time for controlling,
      (1) said chlorine process value;
      (2) said conductivity process value;
      (3) said level process value; and
      (4) said pH process value; and
   b. samples at consecutive intervals of time separated by a user defined scan time and saves to said electronic data storage,
      (1) the chlorine process value, said chlorine set value, and said chlorine manipulated value;
      (2) the conductivity process value, said conductivity set value, and said conductivity manipulated value;
      (3) the level process value, said level set value, and said level manipulated value; and
      (4) the pH process value, said pH set value, and said pH manipulated value; and
   c. permits a user to transition control based on,
      (1) the chlorine set value and the chlorine process value to a rate-of-change chlorine process value and a rate-of-change chlorine set value;
      (2) the conductivity set value and the conductivity process value to a rate-of-change conductivity set value and a rate-of-change conductivity process value;
      (3) the level set value and the level process value to a rate-of-change level set value and a rate-of-change level process value; and
      (4) the pH set value and the pH process value to a rate-of-change set value and a rate-of-change pH process value; and
   d. outputs,
      (1) to said hypochlorite dosing pump the chlorine manipulated value;
      (2) to said conductivity control valve the conductivity manipulated value;
      (3) to said level control valve the level manipulated value; and
      (4) to said acid dosing pump the pH manipulated value.

8. The system in claim 1 wherein said process value subprogram comprises an algorithm that,
   a. programs said programmable controller to calculate,
      (1) a rate-of change chlorine process value;
      (2) a rate-of-change conductivity process value;
      (3) a rate-of-change level process value; and
      (4) a rate-of-change pH process value; and
   b. return to said main program,
      (1) said rate-of change chlorine process value;
      (2) said rate-of-change conductivity process value;
      (3) said rate-of-change level process value; and
      (4) said rate-of-change pH process value.

9. The system in claim 1 wherein said set value subprogram comprises an algorithm that,
   a. programs said programmable controller to calculate,
      (1) a rate-of change chlorine set value;
      (2) a rate-of-change conductivity set value;
      (3) a rate-of-change level set value;
      (4) a rate-of-change pH set value; and b. to determine a correct arithmetic sign, plus or minus, for,
    (1) said rate-of change chlorine set value;
    (2) said rate-of-change conductivity set value;
    (3) said rate-of-change level set value;
    (4) said rate-of-change pH set value; and
c, to return to said main program,
    (1) the rate-of change chlorine set value with said correct arithmetic sign;
    (2) the rate-of-change conductivity set value with the correct arithmetic sign;
    (3) the rate-of-change level set value with the correct arithmetic sign; and
    (4) the rate-of-change pH set value with the correct arithmetic sign.

10. The system in claim 1 wherein said data smoothing subprogram comprises an algorithm that,
a. mathematically reduces a difference between consecutively sampled,
    (1) chlorine set values which results in a smoothed chlorine set value;
    (2) conductivity set values which results in a smoothed conductivity set value;
    (3) level set values which results in a smoothed level set value; and
    (4) pH set values which results in a smoothed pH set value; and
b. returns to said set value subprogram,
    (1) said smoothed chlorine set value;
    (2) said smoothed conductivity set value;
    (3) said smoothed level set value; and
    (4) said smoothed pH set value; and
c. mathematically reduces said difference between consecutively sampled,
    (1) chlorine process values which results in a smoothed chlorine process value;
    (2) conductivity process values which results in a smoothed conductivity process value;
    (3) level process values which results in a smoothed level process value; and
    (4) pH process values which results in a smoothed pH process value; and
d. returns to said process value subprogram,
    (1) said smoothed chlorine process value;
    (2) said smoothed conductivity process value;
    (3) said smoothed level process value; and
    (4) said smoothed pH process value.

11. The system in claim 1 wherein said error subprogram comprises an algorithm that,
a. calculates,
    (1) an arithmetic difference between a rate-of-change chlorine set value and a rate-of-change chlorine process value;
    (2) an arithmetic difference between a rate-of-change conductivity set value and rate-of-change conductivity process value;
    (3) an arithmetic difference between a rate-of-change level set value and a rate-of-change level process value;
    (4) an arithmetic difference between a rate-of-change pH set value and a rate-of-change pH process value; and
b. compares,
    (1) said arithmetic difference between said rate-of-change chlorine set value and said rate-of-change chlorine process value to a deadband limit low and a deadband limit high and an error limit low and an error limit high for control of said concentration of free residual chlorine;
    (2) said arithmetic difference between said rate-of-change conductivity set value and said rate-of-change conductivity process value to a deadband limit low and a deadband limit high and an error limit low and an error limit high for control of said conductivity;
    (3) said arithmetic difference between said rate-of-change level set value and said rate-of-change level process value to a deadband limit low and a deadband limit high and an error limit low and an error limit high for control of said basin level; and
    (4) said arithmetic difference between said rate-of-change pH set value and said rate-of-change pH process value to a deadband limit low and a deadband limit high and an error limit low and an error limit high for control of said pH;
c. returns to said set value subprogram a true;
    (1) if the arithmetic difference between the rate-of-change chlorine set value and the rate-of-change chlorine process value is within said deadband limit low and said deadband limit high and said error limit low and said error limit high for control of the concentration of free residual chlorine;
    (2) if the arithmetic difference between the rate-of-change conductivity set value and the rate-of-change conductivity process value is within said deadband limit low and said deadband limit high and said error limit low and said error limit high for control of the conductivity;
    (3) if the arithmetic difference between the rate-of-change level set value and the rate-of-change level process value is within said deadband limit low and said deadband limit high and said error limit low and said error limit high for control of the basin level; and
    (4) if the arithmetic difference between the rate-of-change pH set value and the rate-of-change pH process value is within said deadband limit low and said deadband limit high and said error limit low and said error limit high for control of the pH;
d. or returns to the set value subprogram a false;
    (1) if die arithmetic difference between the rate-of-change chlorine set value and the rate-of-change chlorine process value is not within the deadband limit low and the deadband limit high and the error limit low and the error limit high for control of the concentration of free residual chlorine;
    (2) if the arithmetic difference between the rate-of-change conductivity set value and the rate-of-change conductivity process value is not within the deadband limit low and the deadband limit high and the error limit low and the error limit high for control of the conductivity;
    (3) if the arithmetic difference between the rate-of-change level set value and the rate-of-change level process value is not within the deadband limit low and the deadband limit high and the error limit low and the error limit high for control of the basin level; and
    (4) if the arithmetic difference between the rate-of-change pH set value and the rate-of-change pH process value is not within the deadband limit low and the deadband limit high and the error limit low and the error limit high for control of the pH.

12. The system in claim 1 wherein said data table comprises storage for;
   a. control of said concentration of free residual chlorine a set of high, low, and midpoint values for a scan time, a PV multiplier, a $1^{st}$ PV smooth time, a $2^{nd}$ PV smooth time, a PV divisor, a $1^{st}$ SV smooth time, a proportional gain, an integral time, a derivative time, an error limit high, an error limit low, a deadband limit high, and a deadband limit low;
   b. control of said conductivity a set of high, low, and midpoint values for a scan time, a PV multiplier, a $1^{st}$ PV smooth time, a $2^{nd}$ PV smooth time, a PV divisor, a $1^{st}$ SV smooth time, a proportional gain, an integral time, a derivative time, an error limit high, an error limit low, a deadband limit high, and a deadband limit low;
   c. control of said level a set of high, low, and midpoint values for a scan time, a PV multiplier, a $1^{st}$ PV smooth time, a $2^{nd}$ PV smooth time, a PV divisor, a 1st SV smooth time, a proportional gain, an integral time, a derivative time, an error limit high, an error limit low, a deadband limit high, and a deadband limit low; and
   d. control of said pH a set of high, low, and midpoint values for a scan time, a PV a 1st PV smooth time, a 2nd PV smooth time, a PV divisor, a 1st SV smooth time, a proportional gain, an integral time, a derivative time, an error limit high, an error limit low, a deadband limit high, and a deadband limit low.

13. A method which, for a large, open recirculating cooling tower, improves control of concentration of free residual chlorine, conductivity, and pH in cooling water, and level in a cooling tower basin, comprising;
   a. selecting a programmable controller that is user-programmable and provisioned for proportional, integral, and derivative control;
   b. outfitting said programmable controller with a user interface for programming, and display of set values, process values, and manipulated values;
   c. selecting a chlorine probe for measuring said concentration of free residual chlorine, a conductivity probe for measuring said conductivity, a level probe for measuring said level, and a pH probe for measuring said pH all electronically connected as inputs to said programmable controller;
   d. selecting a hypochlorite dosing pump, a conductivity control valve, a level control valve, and an acid dosing pump electronically connected as outputs from the programmable controller;
   e. selecting electronic data storage;
   f. connecting wirelessly or by hardwire the programmable controller to said chlorine probe, said conductivity probe, said level probe, and said pH probe;
   g. connecting wirelessly or by hardwire the programmable controller to said hypochlorite dosing pump, said conductivity control valve, said level control valve, and said acid dosing pump;
   h. connecting wirelessly or by hardwire the programmable controller to said electronic data storage;
   i. provisioning the programmable controller with software;
   j. entering by said user interface into the programmable controller a chlorine set value, a conductivity set value, a level set value, and pH set value;
   k. programming said software with,
      (1) a main program, a process value subprogram, a set value subprogram, a data smoothing subprogram, an error subprogram; and
      (2) a data table communicating with said main program, said process value subprogram, said set value subprogram, said data smoothing subprogram, and said error subprogram;

whereby the programmable controller outputs a chlorine manipulated value to said hypochlorite dosing pump to admit an aqueous hypochlorite-containing solution to achieve a difference between a chlorine process value and said chlorine set value of no more than +/−0.1 mg/l, and outputs a conductivity manipulated value to said conductivity control valve to achieve a difference between a conductivity process value and said conductivity set value of no more than +/−30 μS/cm, and outputs a level manipulated value to said level control valve to achieve a difference between a level process value and said level set value of no more than +/−0.5 inches, and outputs a pH manipulated value to said acid closing pump to admit an aqueous acid-containing solution to achieve a difference between a pH process value and said set value of no more than +/−0.05 pH units.

14. The method in claim 13 stopped wherein said user interface,
   a. permits a user to enter a program in said programmable controller; and
   b. display,
      (1) said chlorine process value, said chlorine set value, said chlorine manipulated value;
      (2) said conductivity process value, said conductivity set value, said conductivity manipulated value;
      (3) said level process value, said level set, value, said level manipulated value;
      (4) said pH process value, said pH set value, and said pH manipulated value.

15. The method in claim 13 wherein said programmable controller comprises;
   a. a chlorine controller which is user-programmable and provisioned for proportional, integral, and derivative control to control said concentration of free residual chlorine in said cooling water;
   b. a conductivity controller which is user-programmable and provisioned for proportional, integral, and derivative control to control said conductivity in the cooling water;
   c. a level controller which is user-programmable and provisioned for proportional, integral, and derivative control to control said level in said cooling tower basin; and
   d. a pH controller which is user-programmable and provisioned for proportional, integral, and derivative, control to control said pH in the cooling water.

16. The method in claim 13 wherein;
   a. said chlorine probe has a nominal measurement range of 0 to 5 ppm;
   b. said conductivity probe has a nominal measurement range of 0 to 10,000 μS/cm;
   c. said level probe has a nominal measurement range of 0 to 60 inches; and
   d. said pH probe has a nominal measurement range of 0 to 14 pH units.

17. The method in claim 13 wherein;
   a. said hypochlorite dosing pump is a variable stroke pump to admit said aqueous hypochlorite-containing solution to said large open recirculating cooling tower;
   b. said conductivity control valve is a control valve to release water from the large open recirculating cooling tower;

c. said level control valve is a control valve to admit fresh water to the large open recirculating cooling tower; and d. said acid dosing pump is a variable stroke pump to admit said aqueous acid-containing solution to the large open recirculating cooling tower.

18. The method in claim 13 wherein said electronic data storage comprises sufficient storage for;
   a. said chlorine process value, said chlorine set value, said chlorine manipulated value, a rate-of-change chlorine process value, and a rate-of-change chlorine set value;
   b. said conductivity process value, said conductivity set value, said conductivity manipulated value a rate-of-change conductivity process value, and a rate-of-change conductivity set value;
   c. said level process value, said level set value, said level manipulated value, a rate-of-change level process value, and a rate-of-change level set value;
   d. said pH process, value, said pH set value, said pH manipulated value, a rate-of-change pH process value, and a rate-of-change pH set value; and
   e. data entered into said data table.

19. The method in claim 13 wherein said main program comprises an algorithm that,
   a. stores a proportional gain, an integral time, and a derivative time for controlling,
      (1) said chlorine process value;
      (2) said conductivity process value;
      (3) said level process value; and
      (4) said pH process value; and
   b. samples at consecutive intervals of time separated by a user defined scan time and saves to said electronic data storage,
      (1) the chlorine process value, said chlorine set value, and said chlorine manipulated value;
      (2) the conductivity process value, said conductivity set value, and said conductivity manipulated value;
      (3) the level process value, said level set value, and said level manipulated value; and
      (4) the pH process value, said pH set value, and said pH manipulated value; and
   c. permits a user to transition control based on,
      (1) the chlorine set value and the chlorine process value to a rate-of-change chlorine process value and a rate-of-change chlorine set value;
      (2) the conductivity set value and the conductivity process value to a rate-of-change conductivity set value and a rate-of-change conductivity process value;
      (3) the level set value and the level process value to a rate-of-change level set value and a rate-of-change level process value; and
      (4) the pH set value and the pH process value to rate-of-change pH set value and a rate-of-change pH process value; and
   d. outputs,
      (1) to said hypochlorite dosing pump the chlorine manipulated value;
      (2) to said conductivity control valve the conductivity manipulated value;
      (3) to said level control valve the level manipulated value; and
      (4) to said acid dosing pump the pH manipulated value.

20. The method in claim 13 wherein said process value subprogram comprises an algorithm that,
   a. programs said programmable controller to calculate,
      (1) a rate-of change chlorine process value;
      (2) a rate-of-change conductivity process value;
      (3) a rate-of-change level process value; and
      (4) a rate-of-change pH process value; and
   b. return to said main program,
      (1) said rate-of change chlorine process value;
      (2) said rate-of-change conductivity process value;
      (3) said rate-of-change level process value; and
      (4) said rate-of-change pH process value.

21. The method in claim 13 wherein said set value subprogram comprises an algorithm that,
   a. programs said programmable controller to calculate,
      (1) a rate-of change chlorine set value;
      (2) a rate-of-change conductivity set value;
      (3) a rate-of-change level set value;
      (4) a rate-of-change pH set value; and
   b. to determine a correct arithmetic sign, plus or minus, for,
      (1) said rate-of change chlorine set value;
      (2) said rate-of-change conductivity set value;
      (3) said rate-of-change level set value;
      (4) said rate-of-change pH set value; and
   c. to return to said main program,
      (1) the rate-of change chlorine set value with said correct arithmetic sign;
      (2) the rate-of-change conductivity set value with the correct arithmetic sign;
      (3) the rate-of-change level set value with the correct arithmetic sign; and
      (4) the rate-of-change pit set value with the correct arithmetic sign.

22. The method in claim 13 wherein said data smoothing subprogram comprises an algorithm that,
   a. mathematically reduces a difference between consecutively sampled,
      (1) chlorine set values which results in a smoothed chlorine set value;
      (2) conductivity set values which results in a smoothed conductivity set value;
      (3) level set values which results in a smoothed level set value; and
      (4) pH set values which results in a smoothed pH set value; and
   b. returns to said set value subprogram,
      (1) said smoothed chlorine set value;
      (2) said smoothed conductivity set value;
      (3) said smoothed level set value; and
      (4) said smoothed pH set value; and
   c. mathematically reduces said difference between consecutively sampled,
      (1) chlorine process values which results in a smoothed chlorine process value;
      (2) conductivity process values which results in a smoothed conductivity process value;
      (3) level process values which results in a smoothed level process value; and
      (4) pH process values which results in a smoothed pH process value; and
   d. returns to said process value subprogram,
      (1) said smoothed chlorine process value;
      (2) said smoothed conductivity process value;
      (3) said smoothed level process value; and
      (4) said smoothed pH process value.

23. The method in claim 13 wherein said error subprogram comprises an algorithm that,
   a. calculates,
      (1) an arithmetic difference between a rate-of-change chlorine set value and a rate-of-change chlorine process value;

(2) an arithmetic difference between a rate-of-change conductivity set value and a rate-of-change conductivity process value;

(3) an arithmetic difference between a rate-of-change level set value and a rate-of-change level process value;

(4) an arithmetic difference between a rate-of-change pH set value and a rate-of-change pH process value; and b. compares, (1) said arithmetic difference between said rate-of-change chlorine set value and said rate-of-change chlorine process value to a deadband limit low and a deadband limit high and an error limit low and an error limit high for control of said concentration of free residual chlorine;

(2) said arithmetic difference between said rate-of-change conductivity set value and said rate-of-change conductivity process value to a deadband limit low and a deadband limit high and an error limit low and an error limit high for control of said conductivity;

(3) said arithmetic difference between said rate-of-change level set value and said rate-of-change level process value to a deadband limit low and a deadband limit high and an error limit low and an error limit high for control of said basin level; and (4) said arithmetic difference between said rate-of-change pH set value and said rate-of-change pH process value to a deadband limit low and a deadband limit high and an error limit low and an error limit high for control of said pH;

c. returns to said set value subprogram a true;

(1) if the arithmetic difference between the rate-of-change chlorine set value and the rate-of-change chlorine process value is within said deadband limit low and said deadband limit high and said error limit low and said error limit high for control of the concentration of free residual chlorine;

(2) if the arithmetic difference between the rate-of-change conductivity set value and the rate-of-change conductivity process value is within said deadband limit low and said deadband limit high and said error limit low and said error limit high for control of the conductivity;

(3) if the arithmetic difference between the rate-of-change level set value and the rate-of-change level process value is within said deadband limit low and said deadband limit high and said error limit low and said error limit high for control of the basin level; and (4) if the arithmetic difference between the rate-of-change pH set value and the rate-of-change pH process value is within said deadband limit low and said deadband limit high and said error limit low and said error limit high for control of the pH;

d. or returns to the set value subprogram a false;

(1) if the arithmetic difference between the rate-of-change chlorine set value and the rate-of-change chlorine process value is not within the deadband limit low and the deadband limit high and the error limit low and the error limit high for control of the concentration of free residual chlorine;

(2) if the arithmetic difference between the rate-of-change conductivity set value and the rate-of-change conductivity process value is not within the deadband limit low and the deadband limit high and the error limit low and the error limit high for control of the conductivity;

(3) if the arithmetic difference between the rate-of-change level set value and the rate-of-change level process value is not within the deadband limit low and the deadband limit high and the error limit low and the error limit high for control of the basin level; and (4) if the arithmetic difference between the rate-of-change pH set value and the rate-of-change pH process value is not within the deadband limit low and the deadband limit high and the error limit low and the error limit high for control of the pH.

24. The method in claim 13 wherein said data table comprises storage for;

a. control of said concentration of free residual chlorine a set of high, low, and midpoint values for a scan time, a PV multiplier, a $1^{st}$ PV smooth time, a $2^{nd}$ PV smooth time, a PV divisor, a $1^{st}$ SV smooth time, a proportional gain, an integral time, a derivative time, an error limit high, an error limit low, a deadband limit high, and a deadband limit low;

b. control of said conductivity a set of high, low, and midpoint values for a scan time, a PV multiplier, a $1^{st}$ PV smooth time, a $2^{nd}$ PV smooth time, a PV divisor, a $1^{st}$ SV smooth time, a proportional gain, an integral time, a derivative time, an error limit high, an error limit low, a deadband limit high, and a deadband limit low;

c. control of said level a set of high, low, and midpoint values for a scan time, a PV multiplier, a 1st PV smooth time, a 2nd PV smooth time, a PV divisor, a 1st SV smooth time, a proportional gain, an integral time, a derivative time, an error limit high, an error limit low, a deadband limit high, and a deadband limit low; and d. control of said pH a set of high, low, and midpoint values for a scan time, a PV multiplier, a 1st PV smooth time, a 2nd PV smooth time, a PV divisor, a 1st SV smooth time, a proportional gain, an integral time, a derivative time, an error limit high, an error limit low, a deadband limit high, and a deadband limit low.

* * * * *